(12) United States Patent
Kamio

(10) Patent No.: US 11,601,568 B2
(45) Date of Patent: Mar. 7, 2023

(54) IMAGE READING APPARATUS, CONTROL METHOD, AND PRODUCT FOR ADJUSTING A CORRECTING VALUE FOR CONNECTED IMAGE DATA FROM LINE SENSORS BASED ON MEASURED SKEW DURING DOCUMENT CONVEYANCE

(71) Applicant: CANON KABUSHIKI KAISHA, Tokyo (JP)

(72) Inventor: Yuki Kamio, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/720,816

(22) Filed: Apr. 14, 2022

(65) Prior Publication Data

US 2022/0345586 A1 Oct. 27, 2022

(30) Foreign Application Priority Data

Apr. 23, 2021 (JP) .............................. JP2021-073186

(51) Int. Cl.
| | | |
|---|---|---|
| *H04N 1/401* | (2006.01) | |
| *H04N 1/12* | (2006.01) | |
| *H04N 1/00* | (2006.01) | |
| *H04N 1/053* | (2006.01) | |
| *H04N 1/191* | (2006.01) | |

(52) U.S. Cl.
CPC ......... *H04N 1/401* (2013.01); *H04N 1/00034* (2013.01); *H04N 1/00045* (2013.01); *H04N 1/00068* (2013.01); *H04N 1/00082* (2013.01); *H04N 1/00819* (2013.01); *H04N 1/053* (2013.01); *H04N 1/1215* (2013.01); *H04N 1/1917* (2013.01)

(58) Field of Classification Search
None
See application file for complete search history.

(56) References Cited

U.S. PATENT DOCUMENTS 4,870,505 A * 9/1989 Mitsuki ................ H04N 1/1903
358/494
6,263,117 B1 * 7/2001 Lee ........................ H04N 1/401
382/254

(Continued)

FOREIGN PATENT DOCUMENTS

JP 2015/119388 6/2015 ............... H04N 1/04

*Primary Examiner* — Scott A Rogers
(74) *Attorney, Agent, or Firm* — Venable LLP

(57) ABSTRACT

An object of the present disclosure is to implement highly accurate image connecting processing between line sensors. One embodiment of the present invention is an image reading apparatus having: a plurality of line image sensors arrayed in a first direction; a conveyance unit configured to convey a document in a second direction intersecting with the first direction; a calculation unit configured to calculate a correction value for correcting a deviation at the time of connecting image data obtained by each of the plurality of line image sensors based on read data obtained by reading a chart with the plurality of line image sensors, on which a plurality of dot patterns is printed and which is conveyed by the conveyance unit; a measurement unit configured to measure an amount of conveyance in the first direction in a case where the document is conveyed in the second direction by the conveyance unit.

13 Claims, 23 Drawing Sheets

(56) References Cited

U.S. PATENT DOCUMENTS

| | | | | |
|---|---|---|---|---|
| 7,460,279 B2* | 12/2008 | Iwasaki | ................. | H04N 1/1934 |
| | | | | 358/450 |
| 8,670,163 B2* | 3/2014 | Takahashi | ............ | H04N 1/1933 |
| | | | | 358/488 |
| 9,300,829 B2* | 3/2016 | Sohara | ................ | H04N 1/00819 |
| 10,298,802 B2* | 5/2019 | Netsu | ..................... | H04N 1/028 |
| 10,397,434 B2* | 8/2019 | Momose | ................ | H04N 1/191 |
| 10,406,820 B2* | 9/2019 | Inaba | .................. | B41J 11/0085 |
| 10,506,125 B2* | 12/2019 | Netsu | ................... | H04N 1/1911 |
| 10,659,653 B2* | 5/2020 | Momose | ............ | H04N 1/1933 |
| 11,178,304 B2* | 11/2021 | Kamio | .............. | H04N 1/00068 |
| 2022/0070327 A1* | 3/2022 | Kamio | .............. | H04N 1/00045 |
| 2022/0201155 A1* | 6/2022 | Nakajima | .......... | H04N 1/00737 |

* cited by examiner

TOTAL OF EACH COORDINATE $\sum_{p=0}^{N-1} Xp = \sum_{p=0}^{N-1} Yp = \sum_{p=0}^{N-1} Xp * Yp = 0$ ····(1)

$$Xi = \frac{1}{\cos \varphi} * Xp \quad \cdots\cdot(2)$$

$$Yi = \tan \varphi * Xp + \mu * Yp \quad \cdots\cdot(3)$$

$$Xi * Yi = \frac{\sin \varphi}{(\cos \varphi)^2} * Xp^2 + \frac{\mu}{\cos \varphi} Xp * Yp \quad \cdots\cdot(4)$$

$$Xi^2 = \frac{1}{(\cos \varphi)^2} * Xp^2 \quad \cdots\cdot(5)$$

REGRESSION LINE WITH REFERENCE POINT BEING TAKEN AS CENTER Y=aX+b ····(6)

$$a = \frac{N \sum_{p=0}^{N-1} Xi * Yi - \sum_{p=0}^{N-1} Xi * \sum_{p=0}^{N-1} Yi}{N \sum_{p=0}^{N-1} Xi^2 - \left(\sum_{p=0}^{N-1} Xi\right)^2} \qquad b = \frac{\sum_{p=0}^{N-1} Yi - a \sum_{p=0}^{N-1} Xi}{N} \quad \cdots\cdot(7)$$

$$\sum_{p=0}^{N-1} Xi = \sum_{p=0}^{N-1} \frac{1}{\cos \varphi} * \sum_{p=0}^{N-1} Xm = \frac{1}{\cos \varphi} * Xp = 0 \quad \cdots\cdot(8)$$

$$\sum_{p=0}^{N-1} Yi = \tan \varphi * \sum_{p=0}^{N-1} Xp + \mu * \sum_{p=0}^{N-1} Yp = 0 \quad \cdots\cdot(9)$$

$$\sum_{p=0}^{N-1} Xi * \sum_{p=0}^{N-1} Yi = \frac{\sin \varphi}{(\cos \varphi)^2} * \sum_{p=0}^{N-1} Xp^2 + \frac{\mu}{\cos \varphi} \sum_{p=0}^{N-1} Xp * Yp = \frac{\sin \varphi}{(\cos \varphi)^2} * \sum_{p=0}^{N-1} Xp^2 \quad \cdots\cdot(10)$$

$$a = \frac{N \sum_{p=0}^{N-1} Xi * Yi - 0}{N \sum_{p=0}^{N-1} Xi^2 - 0} = \frac{\frac{\sin \varphi}{(\cos \varphi)^2} \sum_{p=0}^{N-1} Xp^2}{\frac{1}{(\cos \varphi)^2} \sum_{p=0}^{N-1} Xp^2} = \sin \varphi \qquad b = 0 \quad \cdots\cdot(11)$$

$$\varphi = \sin^{-1} a \quad \cdots\cdot(12)$$

FIG.9

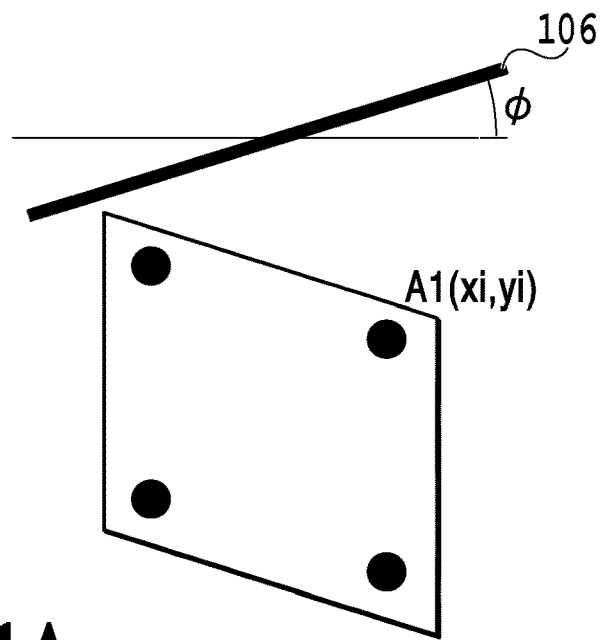
FIG.11A
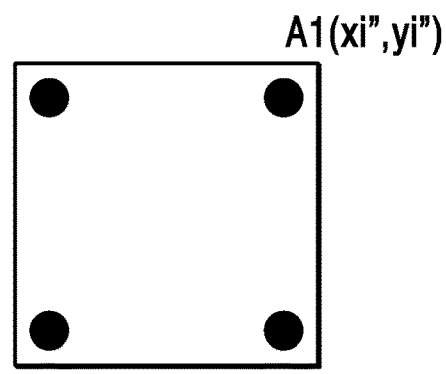
FIG.11B
$$xi" = xi/cos_{-1}\phi$$
$$yi" = yi - xi/tan\phi$$
FIG.11C

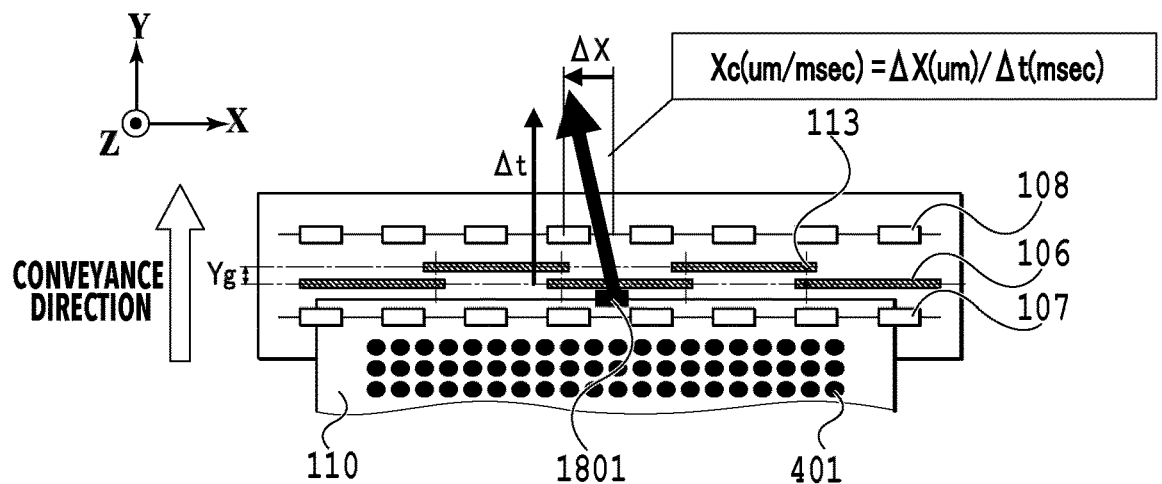
FIG.18A
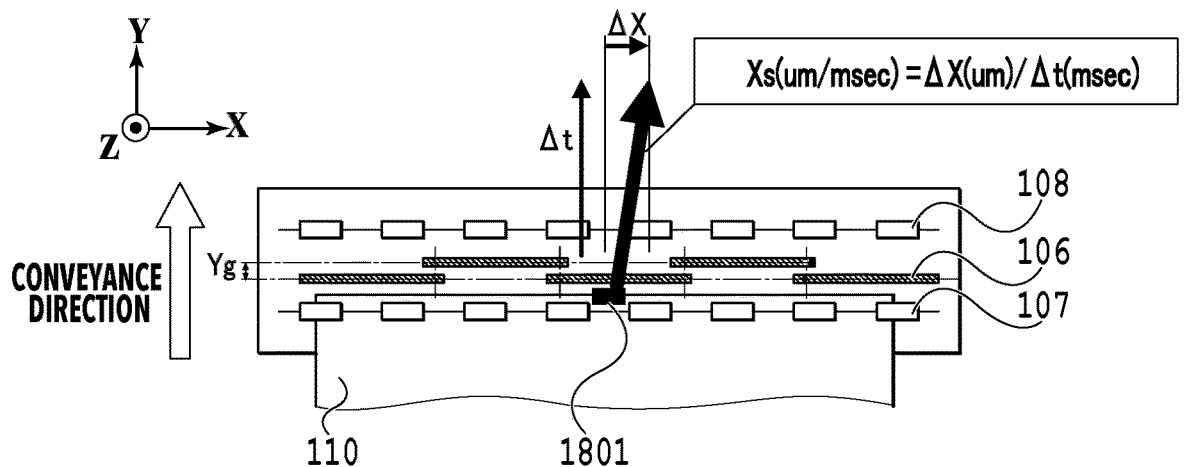
FIG.18B
Xg(um/msec) = Xs(um/msec) − Xc(um/msec)
Yt(msec) = CONVEYANCE SPEED (ips)*25.4/1000/Yg(mm)
Xt(um) = Xg(um/msec)*Yt(msec)
FIG.18C

IMAGE READING APPARATUS, CONTROL METHOD, AND PRODUCT FOR ADJUSTING A CORRECTING VALUE FOR CONNECTED IMAGE DATA FROM LINE SENSORS BASED ON MEASURED SKEW DURING DOCUMENT CONVEYANCE

BACKGROUND

Field

The present disclosure relates to image correction in an image reading apparatus having a line image sensor.

Description of the Related Art

An image reading apparatus for a large size document generally adopts a configuration using a plurality of small size line image sensors, whose cost merit is great. A plurality of line image sensors is used, and therefore, processing to connect data read by each line image sensor is necessary. At this time, in a case where there exists a mechanical attachment tolerance of the line image sensor, the line image sensor position deviates in the X-direction or the Y-direction, or the inclination of the line image sensor deviates from an ideal inclination by an angle Φ. As a result of this, an error occurs in the connecting processing.

FIG. 23A and FIG. 23B show a general configuration of an image reading apparatus using a plurality of line image sensors and an example of reading results. As shown in FIG. 23A, the configuration is such that a document 110 is conveyed by an upstream-side document conveyance roller 107 and a downstream-side document conveyance roller 108 and the document 110 is read by a plurality of line image sensors 2304. At that time, processing to connect the results read by the plurality of the line image sensors 2304 is performed at a connecting position 113, but in a case where there exists a misalignment 2301 of the line image sensor 2304, an error occurs in the connecting position. For example, as shown in FIG. 23B, in a case where a straight line pattern 2302 is read, due to the misalignment of each line image sensor 2304, the straight line pattern 2302 is read as a zigzag line 2303 in which a deviation in the connecting position has occurred at the time of connecting processing.

For the above-described problem, the accurate connecting is implemented by deriving in advance the error component at the time of reading due to the misalignment of the line image sensor by processing called calibration. For example, in order to perform the calibration, by using a document including a specific pattern, the pattern is read. After that, based on the position data of the read specific pattern, the connecting position is derived.

Further, the configuration is such that reading is performed while conveying the document 110, and therefore, in a case where the document conveyance speed changes, an error occurs in the connecting processing. For this problem, by providing a unit configured to detect the document conveyance position, the processing to connect images read by each line image sensor 2304 with a high accuracy even in a case where the document conveyance speed changes has been implemented (Japanese Patent Laid-Open No. 2015-119388).

SUMMARY

Conventionally, like the image reading apparatus of Japanese Patent Laid-Open No. 2015-119388, by deriving the document position in the conveyance direction, the highly accurate connecting processing even in a case where the document conveyance speed changes has been implemented. However, in reality, an error has occurred in the connecting processing and the deviation in an image has occurred resulting from that the amount of skew that occurs by engagement of the roller at the time of document conveyance is different each time of reading.

Consequently an object of the present disclosure is to implement a highly accurate connecting processing between line image sensors without being affected by the skew of the document during conveyance.

One embodiment of the present invention is an image reading apparatus including: a plurality of line image sensors arrayed in a first direction; a conveyance unit configured to convey a document in a second direction intersecting with the first direction; a calculation unit configured to calculate a correction value for correcting a deviation at the time of connecting image data obtained by each of the plurality of line image sensors based on read data obtained by reading a chart with the plurality of line image sensors, on which a plurality of dot patterns is printed and which is conveyed by the conveyance unit; a measurement unit configured to measure an amount of conveyance in the first direction in a case where the document is conveyed in the second direction by the conveyance unit; and an adjusting unit configured to adjust the correction value based on the amount of conveyance in the first direction in a case where the read data is obtained and the amount of conveyance in the first direction in a case where the image data is obtained.

Further features of the present invention will become apparent from the following description of exemplary embodiments with reference to the attached drawings.

BRIEF DESCRIPTION OF THE DRAWINGS

FIG. 9 is a diagram showing an algorithm that is used for the CIS inclination angle derivation in the first embodiment;

FIG. 11A to FIG. 11C are diagrams explaining coordinate conversion based on the inclination of a CIS in the first embodiment;

FIG. 18A to FIG. 18C are schematic diagrams showing a unit configured to derive an amount of conveyance in the first embodiment;

DESCRIPTION OF THE EMBODIMENTS

First Embodiment

In the present embodiment, by reading in advance a specific pattern, the inclination of each line image sensor and the connecting position of image data between each line image sensor are derived, which are used for accurately performing the connecting processing between a plurality of line image sensors.

In detail, by using coordinates within the pattern, the inclination of each line image sensor and the connecting position between each line image sensor are derived. Further, the connecting position is adjusted based on a difference in the amount of conveyance in the direction in which the line image sensors are arranged (specifically, in the X-direction shown in FIG. 1A and the like) between the point in time of the connecting position derivation and the point in time of the derived connecting position application. Due to this, the connecting processing is performed with a high accuracy without being affected by the skew of a read document.

<Configuration of Image Reading Apparatus>

First, a basic configuration of an image reading apparatus is explained by using a general diagram of the image reading apparatus, a diagram showing an image reading aspect and the like.

Figure 1A:
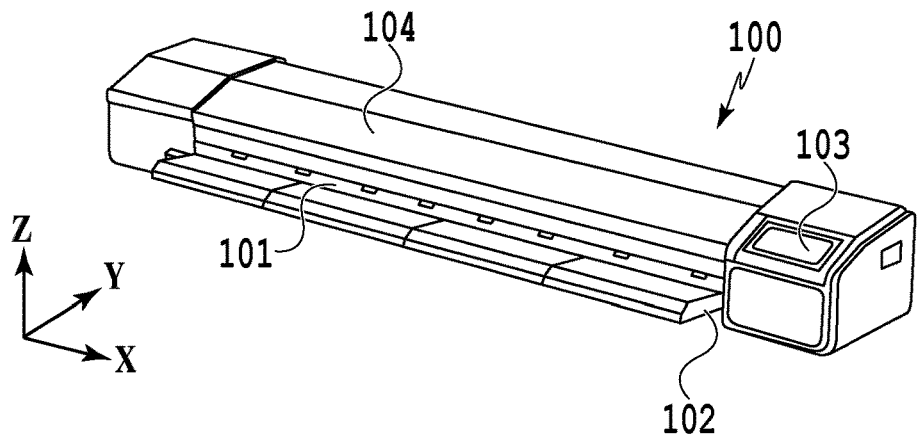
FIG. 1A to FIG. 1C are diagrams showing a general configuration and the like of an image reading apparatus in a first embodiment.

FIG. 1A is a perspective diagram showing an outer appearance of a scanner 100 adopting a sheet feed method. As shown in FIG. 1A, the scanner 100 has a document feed port 101 and a document feed table 102 on the front side of the main body. A user places the tip portion of a document so that the center of the document is located at the center of the feed port on the document feed table 102 and inserts the document into the document feed port 101 by sliding the document on the table. The document feed port 101 is designed so as to be able to allow to a certain extent the misalignment, the inclination and the like at the time of insertion with respect to the width in the main scanning direction (X-direction) of a document that the scanner 100 can read. The configuration of the document feed path is explained in detail in FIG. 1B. For explanation, the coordinate axes are set as shown in FIG. 1A and the coordinate axes are applied similarly to other drawings.

The scanner 100 comprises an operation unit 103 including a physical key, an LCD panel and the like on the top surface of the main body and is able to perform setting of reading conditions and input of a document size. Further, on the top surface of the scanner 100, an upper cover 104 is provided and by the upper cover 104 opening upward, it is made possible to access a reading unit and the like and thereby it is possible to perform maintenance of the main body.

Figure 1B:
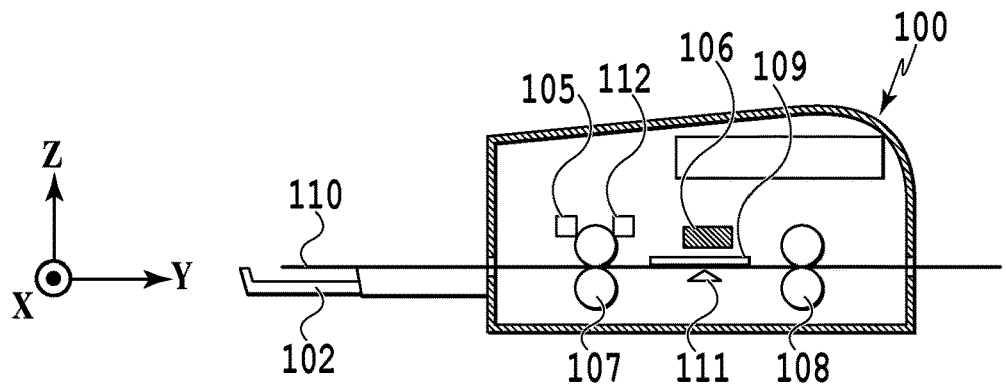
Figure 1C:
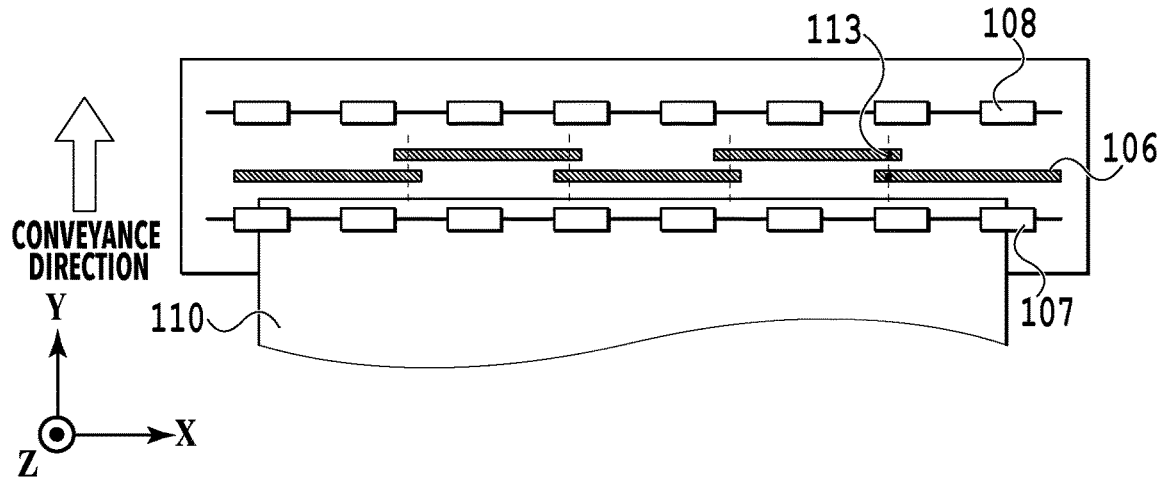

FIG. 1B and FIG. 1C are each a schematic diagram showing the internal configuration of the scanner 100 and FIG. 1B shows a cross-sectional diagram and FIG. 1C shows a top diagram. In the cross-sectional diagram in FIG. 1B, the left side is the upstream side of document feed table and the right side is the downstream side and a document is conveyed in the Y-direction intersecting with the X-direction. The document 100 that is fed by a user along the document feed table 102 passes through a planar conveyance path and is discharged from the rear surface of the main body.

A document detection sensor 105 detects the insertion of the document 110 and in a case where the insertion of the document 110 is detected, a control unit 202 (see FIG. 2) of the scanner 100 causes the document to be pulled into the main body by rotating the upstream-side document conveyance roller 107. An end portion detection sensor 112 is used for detection of the tip portion of the document 110 pulled into the main body by the rotation of the upstream-side document conveyance roller 107. Further, the detection results of the end portion detection sensor 112 are used also for the determination of the reading start position of the document 110, the detection of the position of the rear end portion of the document 110, and the like.

Inside of the main body, the document 100 passes between a glass plate 109 and a document pressing plate 111. The document pressing plate 111 acts to press the document 110 against the glass plate 109 with a predetermined pressure. A CIS 106 is a line image sensor in which light-receiving elements are arrayed in the main scanning direction (in FIG. 1B. in the X-direction) and includes a plurality of chips including a plurality of light-receiving elements. The reading surface of the CIS 106 faces the glass plane 109 and is designed so that the reading focus position is located at the contact surface between the document 110 and the glass plate 109.

The downstream-side document conveyance roller 108 has a configuration that follows the upstream-side document conveyance roller 117 by a belt, not shown schematically, and has a role to discharge a document to the downstream side, which has passed through the area in which the document is pressed against the glass plate 109 by the document pressing plate 111. The control unit 202, to be described later, includes a circuit substrate for controlling each detection sensor, a motor, not shown schematically, for rotating the upstream-side document conveyance roller 107, the CIS 106, and the operation unit 103.

The top diagram in FIG. 1C shows that the scanner 100 has a configuration in which a plurality of the CIS's 106 (in this example, five CIS's 106) is arranged in a staggered pattern in the main scanning direction. The scanner 100 performs reading by each CIS 106 and the control unit 202 performs processing to connect the data read by each CIS 106 at the connecting position 113.

Figure 2:
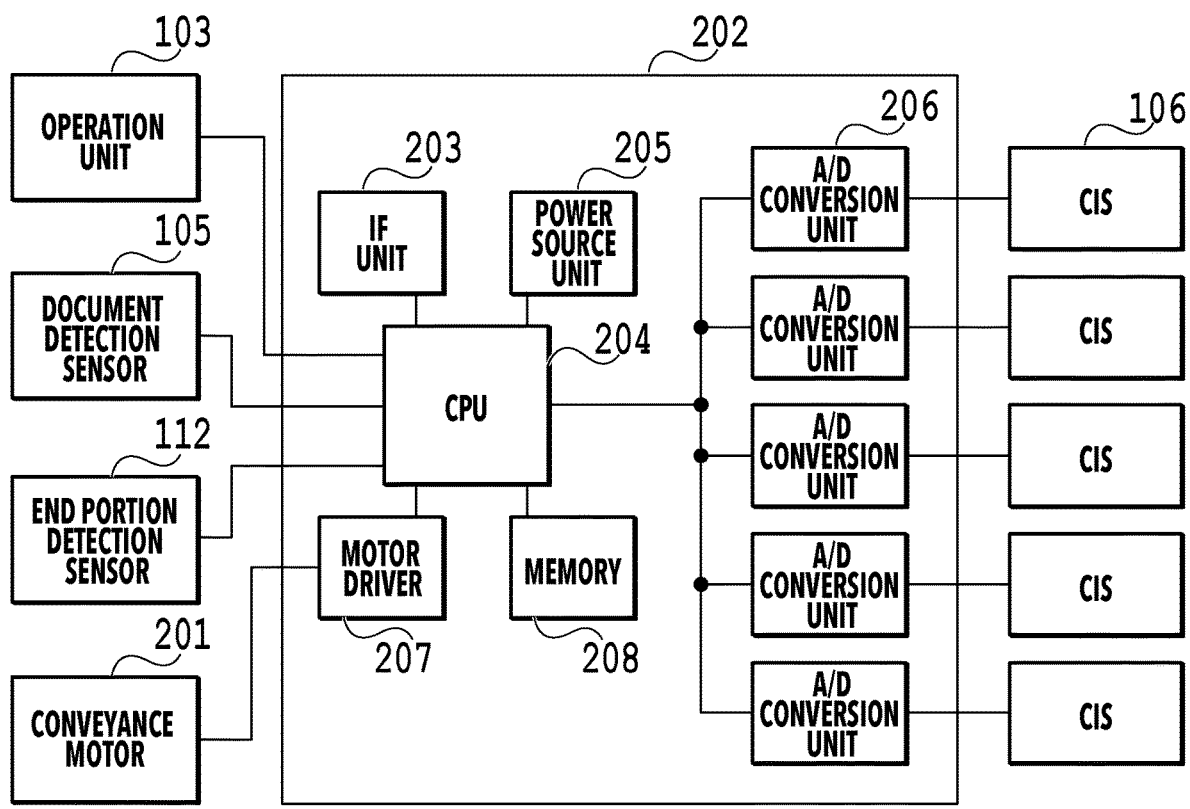
FIG. 2 is a block diagram showing a hardware configuration of the image reading apparatus in the first embodiment.

FIG. 2 is a block diagram showing the hardware configuration of the scanner 100 in the present embodiment. The control unit 202 configured to control image reading and the like in the scanner 100 has a CPU 204, a memory 208, a motor driver 207, an interface (in the following, IF) unit 203, an A/D conversion unit 206, and a power source unit 205. The operation unit 103 includes an LCD (abbreviation of Liquid Crystal Display)-attached touch panel. On the LCD of the operation unit 103, information relating to a document for which reading is performed and settings and the like of a reading device is displayed in accordance with the instructions from the CPU 204. Further, it is possible for a user to change the input to the scanner 100, for example, various settings by the touch panel operation for the operation unit 103 while checking the information displayed on the LCD of the operation unit 103.

A conveyance motor 201 is controlled by the CPU 204 via the motor driver 207 and rotates the upstream-side document conveyance roller 107 and the downstream-side document conveyance roller 108. The configuration is such that the output of the document detection sensor 105 and the end portion detection sensor 112 is input to the CPU 204 and the CPU 204 performs control to determine drive timing of the plurality of the CIS's 106 and so on based on the change in the output signals of these sensors and the state of the conveyance motor 201.

The plurality of the CIS's 106 outputs the read image to the control unit 202 as an analog signal. The analog signal that is output from the plurality of the CIS's 106 is converted into a digital signal by the A/D conversion unit 206 and input to the CPU 204. It is possible for the CPU 204 to process the data converted into the digital signal by the A/D conversion unit 206 and transmit the data as image data to an external device connected by USB or LAN via the IF unit 203. The power source unit 205 generates a voltage necessary for each unit and supplies electric power. It is possible for the memory 208 to store image data corresponding to a plurality of lines.

<Calibration>

Figure 3:
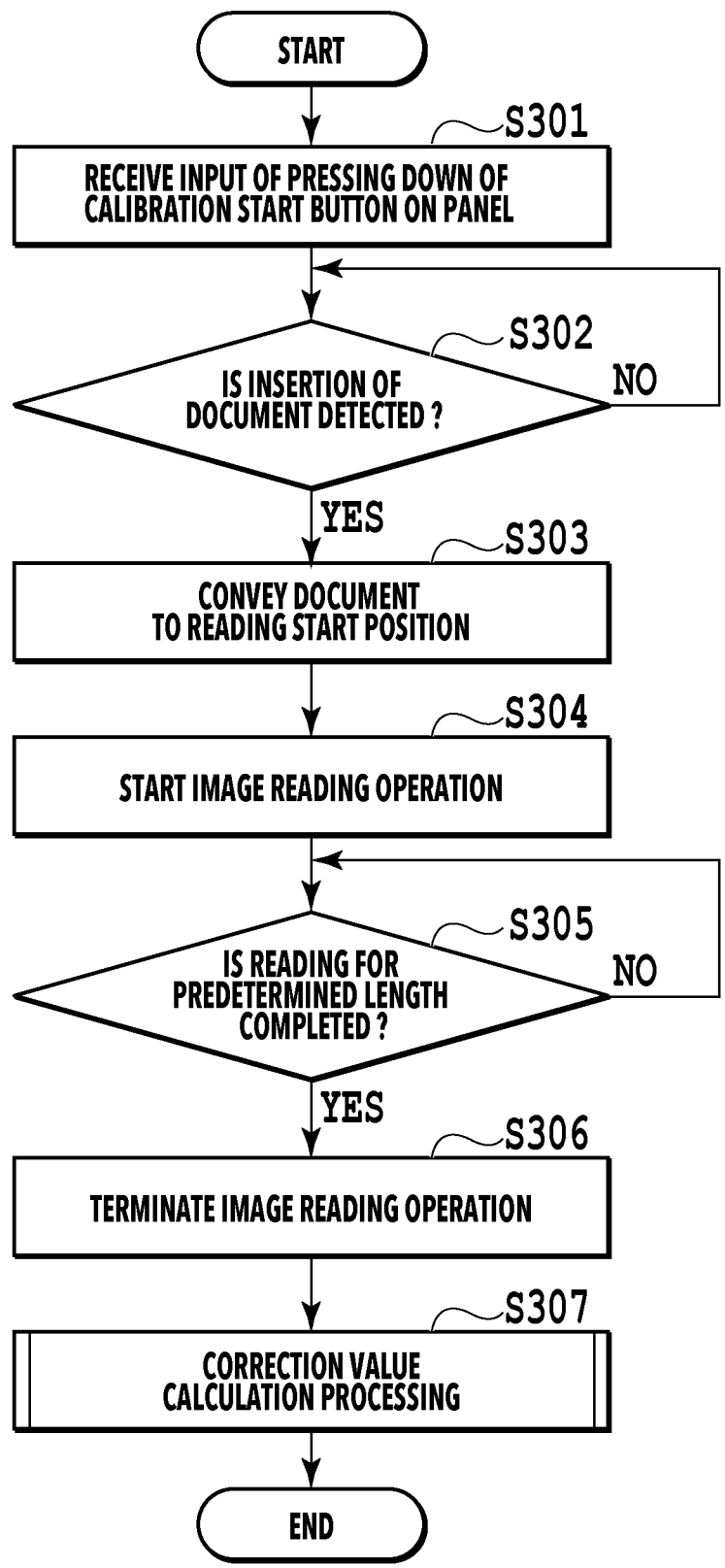
FIG. 3 is a flowchart of calibration processing of the image reading apparatus in the first embodiment.

In the following, a flow of reading the document 110 by using the CIS 106 and performing correction value calculation is explained by using FIG. 3. As the timing of correction value calculation, it may also be possible to calculate a correction value in advance or calculate a correction value each time of reading.

In a case were a correction value is calculated in advance, a correction value is calculated by reading a predetermined document prepared at the time of factory shipping or on the user side and after that, the same correction value is applied each time of reading. In this case, it is not necessary to calculate a correction value each time of reading, and therefore, it is possible to reduce the reading time.

On the other hand, in a case where a correction value is calculated each time of reading, a correction value is calculated by reading a predetermined document before reading, or reading a document on which a pattern for correction value calculation is printed in the header portion of a document. In this case, it is made possible to correct the current error component at any time, and therefore, it is possible to implement highly accurate reading.

First, at step S301, the CPU 204 receives the input of pressing down of a calibration start button on the operation unit 103 by a user. By this step, the scanner 100 enters the state of waiting for the insertion of a dedicated document used for calibration. In the following, for simplicity, "step S-" is abbreviated to "S-".

At S302, the CPU 204 determines whether the insertion of the document 110 that is set by a user is detected. In a case where the determination results at this step are affirmative, the processing advances to S303. On the other hand, in a case where the determination results at this step are negative, the insertion detection determination of the document 110 is performed again.

At S303, the CPU 204 conveys the document 110 to the reading start position by controlling the conveyance motor 201.

At S304, the CPU 204 starts the image reading operation and stores the data (referred to as read data) obtained by the reading in the memory 208.

At S305, the CPU 204 determines whether the reading for a predetermined length is completed. In a case where the determination results at this step are affirmative, the processing advances to S306. On the other hand, in a case where the determination results at this step are negative (that is, reading for a predetermined length is not completed), the reading operation is continued until the reading for a predetermined length is completed.

At S306, the CPU 204 terminates the image reading operation and causes the document 110 for calibration to be conveyed up to the discharge position.

At S307, the CPU 204 performs correction value calculation processing. The correction value obtained at this step is stored in the memory 208 and read and applied at the time of the normal reading operation.

Figure 4:
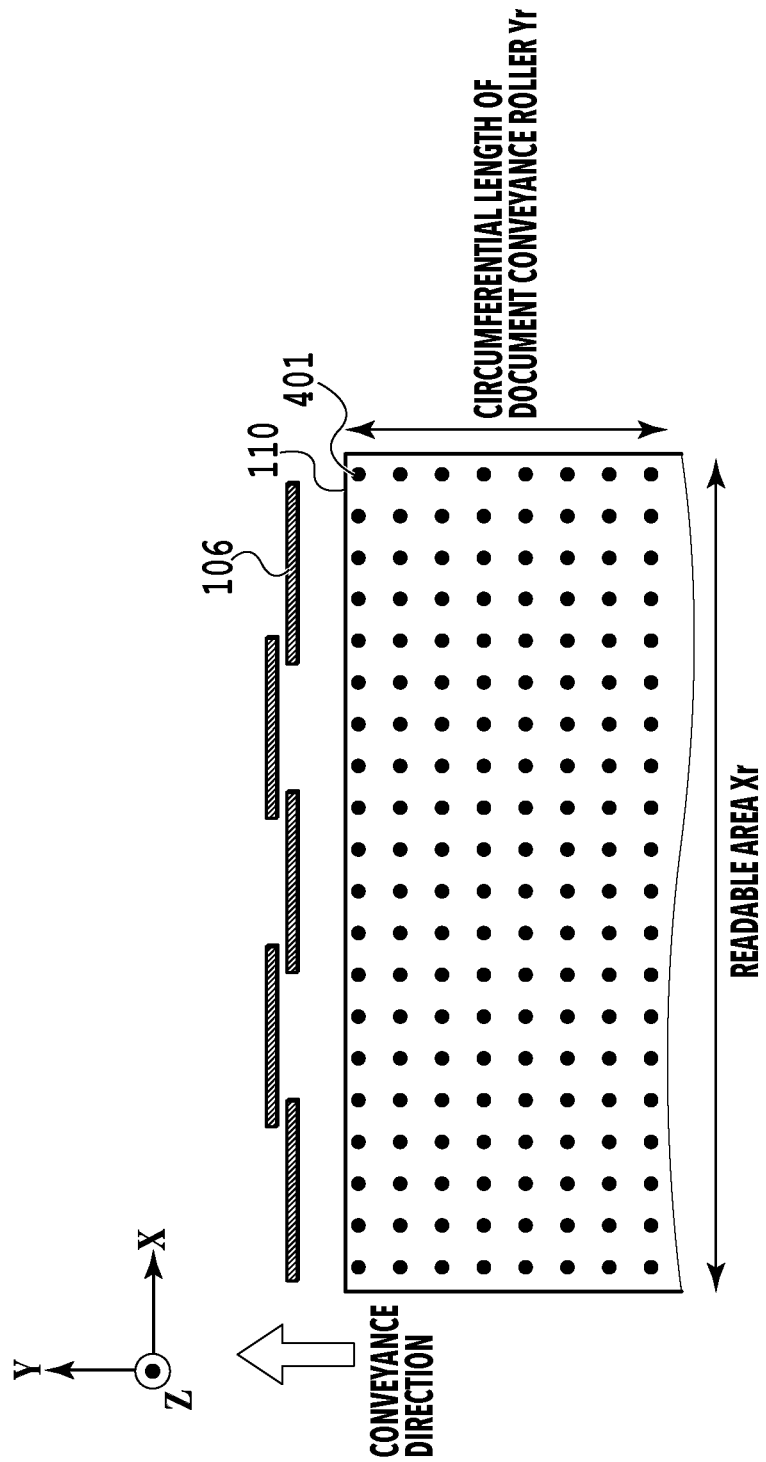
FIG. 4 is a diagram showing a correction value calculation processing pattern.
Figure 5:
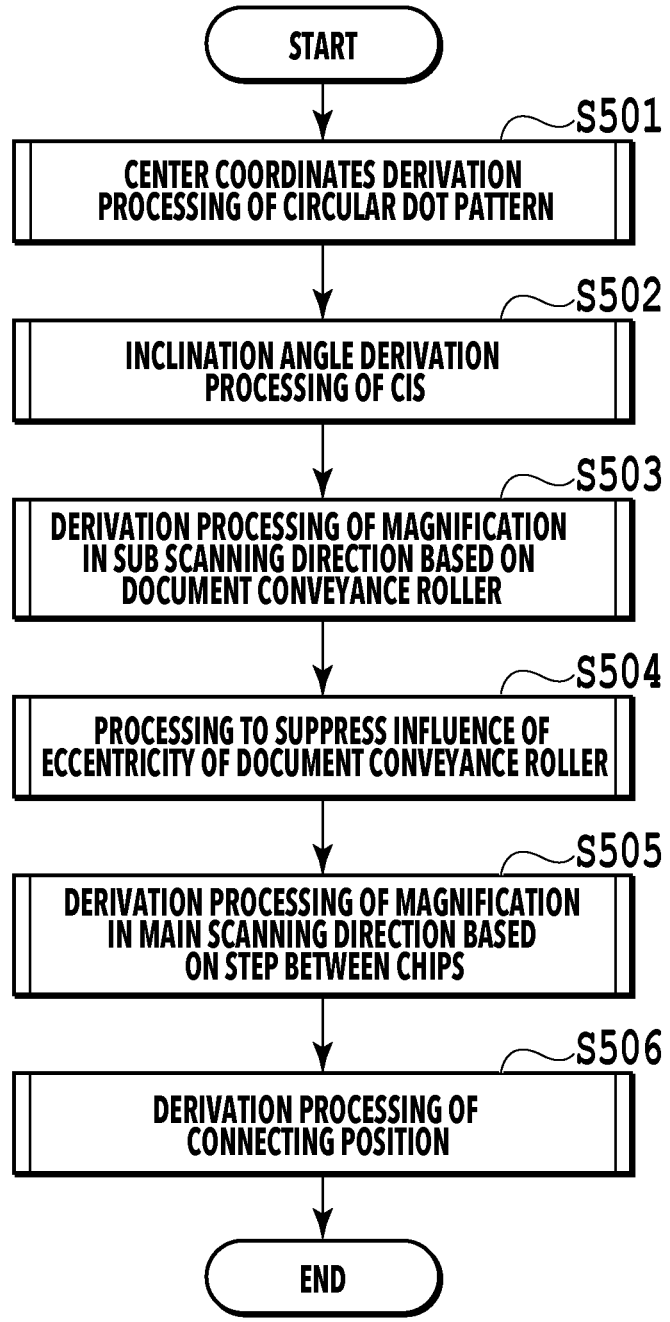
FIG. 5 is a flowchart explaining correction value calculation processing in the first embodiment.

Following the above, the flow (details of S307 in FIG. 3) of performing correction value calculation based on the read pattern is explained by using FIG. 4 and FIG. 5. FIG. 4 is a diagram showing a correction value calculation processing pattern (also called calibration chart) in the present embodiment.

As shown in FIG. 4, in the calibration chart, a plurality of circular dot patterns 401 consisting of a plurality of ON dots (pixel value is 1) is printed in isolation from one another and the circular dot pattern 401 is read while conveying the document by a document conveyance roller. As the pattern arrangement on the document, the plurality of the circular dot patterns 401 is printed across the width (referred to as Xr) of the readable area and across the length (circumferential length is referred to as Yr) corresponding to the circumference of the document conveyance roller 104. It may also be possible to print the plurality of the circular dot patterns 401 more than those corresponding to the circumference of the document conveyance roller 104. Further, in the present embodiment, the circular dot pattern 401 is also called a grid point.

First, at S501, the CPU 204 functions as a derivation unit configured to derive the center coordinates of the circular dot pattern 401 and derives the center coordinates of each circular dot pattern 401 from the read data obtained by the image reading. In derivation processing of each correction value, to be described later, the center coordinates derived at this step are used.

At S502, the CPU 204 performs derivation processing of the inclination angle of the CIS 106. Specifically, the CPU 204 calculates the inclination angle by utilizing that the plurality of the circular dot patterns 401 is arranged concentrically so that the total of the coordinates from the reference coordinates is zero. The derivation processing of the inclination angle at this step is processing for suppressing the deviation in the connecting position 113 at the time of connecting the read data. Due to the information on the inclination angle of the CIS 106, which is found at this step, it is made possible to perform connecting of the read images later with a high accuracy. The derivation processing of each correction value, to be described later, is performed by applying in advance the correction value in accordance with the inclination angle of the CIS 106, which is derived at S502.

At S503, the CPU 204 performs derivation processing of the magnification in the sub scanning direction based on the document conveyance roller. The derivation processing of the magnification in the sub scanning direction based on the document conveyance roller is processing to derive the magnification in the sub scanning direction based on the diameter error of the document conveyance rollers 107 and 108, which affects the entire reading results of the scanner 100.

At S504, the CPU 204 performs processing to suppress the influence of the eccentricity of the document conveyance roller. This step is processing for correcting the reading error in the sub scanning direction due to the eccentricity of the document conveyance roller, which affects the entire reading results of the scanner 100, by finding the eccentricity ratio of the document conveyance roller, and so on.

At S505, the CPU 204 performs derivation processing of the magnification in the main scanning direction based on the step between chips. The derivation processing of the magnification in the main scanning direction based on the step between chips is processing for correcting the reading error in the main scanning direction due to the gap between each chip, which is located inside the CIS 106.

At S506, the CPU 204 performs derivation processing of the connecting position. The derivation processing of the connecting position is processing for performing accurate connecting of the reading results of each CIS 106 and processing to derive the connecting position 113 by applying in advance the correction value corresponding to each step, which is found from the results at S502 to S505. By the above, the calibration accompanied by the calculation of each correction value is completed.

<Center Coordinates Derivation Processing>

Figure 6:
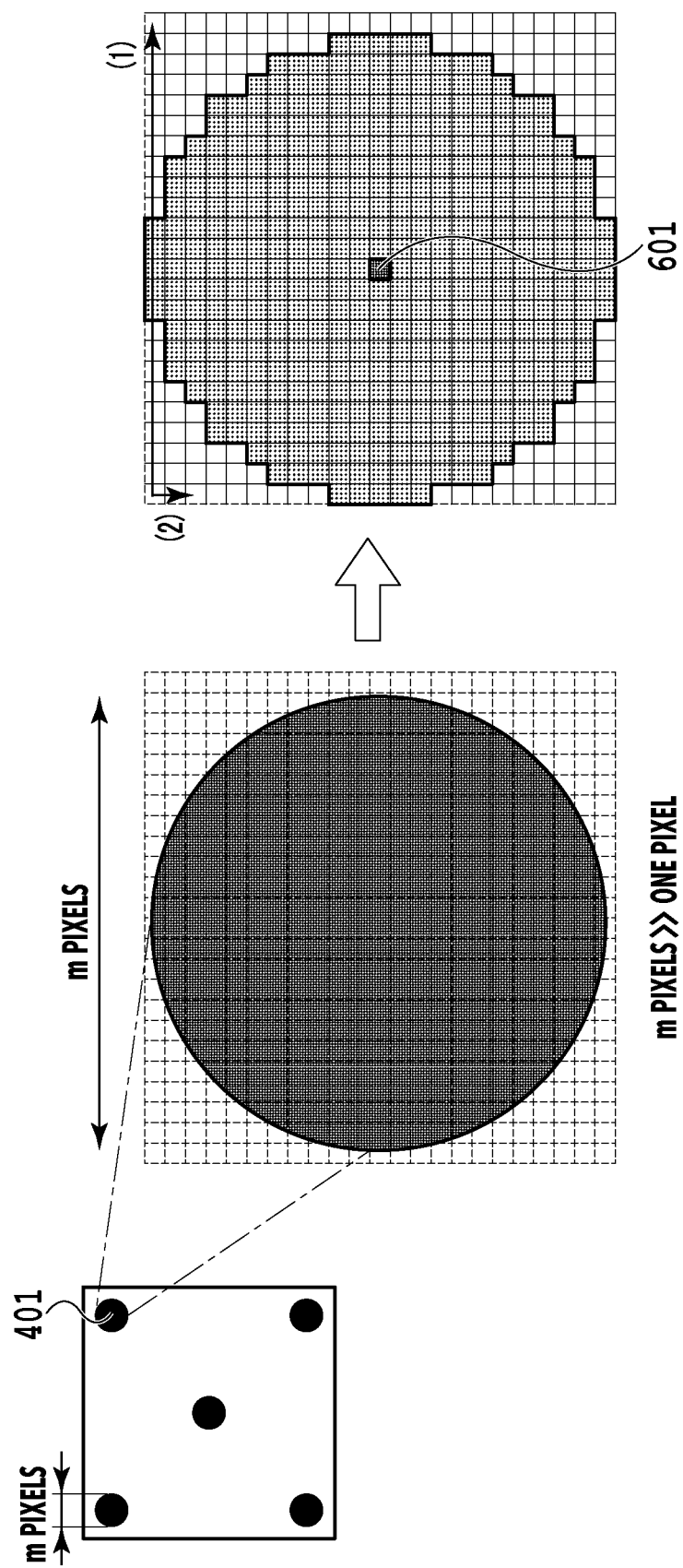
FIG. 6 is a diagram showing a reading-target circular dot pattern in the first embodiment.

In the following, the processing (S501 in FIG. 5) to derive the center coordinates of the circular dot pattern based on the read data is explained specifically by using the circular dot pattern 401 shown in FIG. 6 and the flowchart in FIG. 7. As shown in FIG. 6, the circular dot pattern 401 needs to be a pattern having a certain size with respect to the reading-target pixel by the scanner.

First, at S701, the CPU 204 extracts all the pixel data in the main scanning direction (1) of the CIS 106 at the position of interest in the sub scanning direction (2) of the CIS 106 among all the read data.

At S702, based on the pixel data extracted at S701, the CPU 204 determines whether there are pixels successive in the main scanning direction (1) and whose tone value exceeds a threshold value Xth and performs binarization for each pixel as shown in FIG. 6. In a case where determination results at this step are affirmative, the processing advances to S703 and on the other hand, in a case where the determination results are negative, the processing advances to S705. The threshold value Xth that is used at this step is set in advance and the data thereof is stored in the memory 208.

At S703, the CPU 204 derives the position of the pixel located at the center of the successive pixels whose tone value exceeds the threshold value Xth as the center coordinates in the main scanning direction (1).

At S704, the CPU 204 determines whether the derivation of the center coordinates in the main scanning direction (1) is completed for all the lines in the sub scanning direction (2).

At S705, the CPU 204 advances the position of interest by one pixel in the sub scanning direction (2).

At S706, the CPU 204 calculates the average of the derived center coordinates in the main scanning direction and sets the found average value as center coordinates 601 of the circular dot pattern 401.

In a case where the reading error due to dust is taken into consideration at the time of finding the center coordinates in the main scanning direction, this can be dealt with by increasing the size of the dot pattern. Further, in a case where the reading error due to the gap between chips of the CIS 106 is taken into consideration, it is necessary to find the center coordinates by selecting the portion that does not spread across the space between chips at the time of finding the coordinates in the main scanning direction (1).

It is desirable for the shape of the dot pattern to be substantially circular as shown in FIG. 6. The reason is that the substantially circular shape is a shape that is unlikely to be affected by the error component during reading at the time of deriving the center coordinates 601. For example, in a case where there is an inclination at the time of document setting, on a condition that the shape of the dot pattern is square, it is not easy to determine whether pixels are those successive in the main scanning direction (1) and whose tone value exceeds the threshold value Xth among the image data in the main scanning direction (1) for the read image data of the CIS 106. It is easier to determine pixel data successive in the main scanning direction (1) and whose tone value exceeds the threshold value Xth in a case where the shape is substantially circular than in a case where the shape is square. Further, in a case where the dot pattern is substantially circular, it is not necessary to perform the processing to derive the center coordinates for all the lines in the sub scanning direction (2), which is performed at S704 to S706 in FIG. 7. That is, on the premise that the dot pattern is substantially circular, it is possible to derive the center coordinates 601 of the dot pattern by estimating pixel data successive in the main scanning direction and whose tone value exceeds the threshold value Xth, and therefore, it is made possible to reduce the time required to derive the center coordinates.

<Derivation of Inclination Angle of CIS>

By using the center coordinates 601 derived by the center coordinates derivation processing described previously, the processing ate S502 to S506 is performed. As described previously, in the present embodiment, the inclination angle of the CIS 106 is derived in advance, and therefore, in the following, derivation processing of the inclination angle of the CIS at S02 of the flow of the correction value calculation shown in FIG. 5 is explained.

Figure 8A:
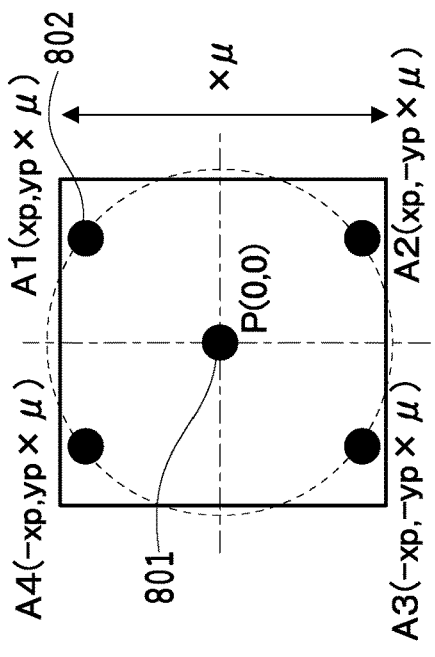
FIG. 8A to FIG. 8D are each a diagram showing a pattern that is used for CIS inclination angle derivation in the first embodiment.
Figure 10:
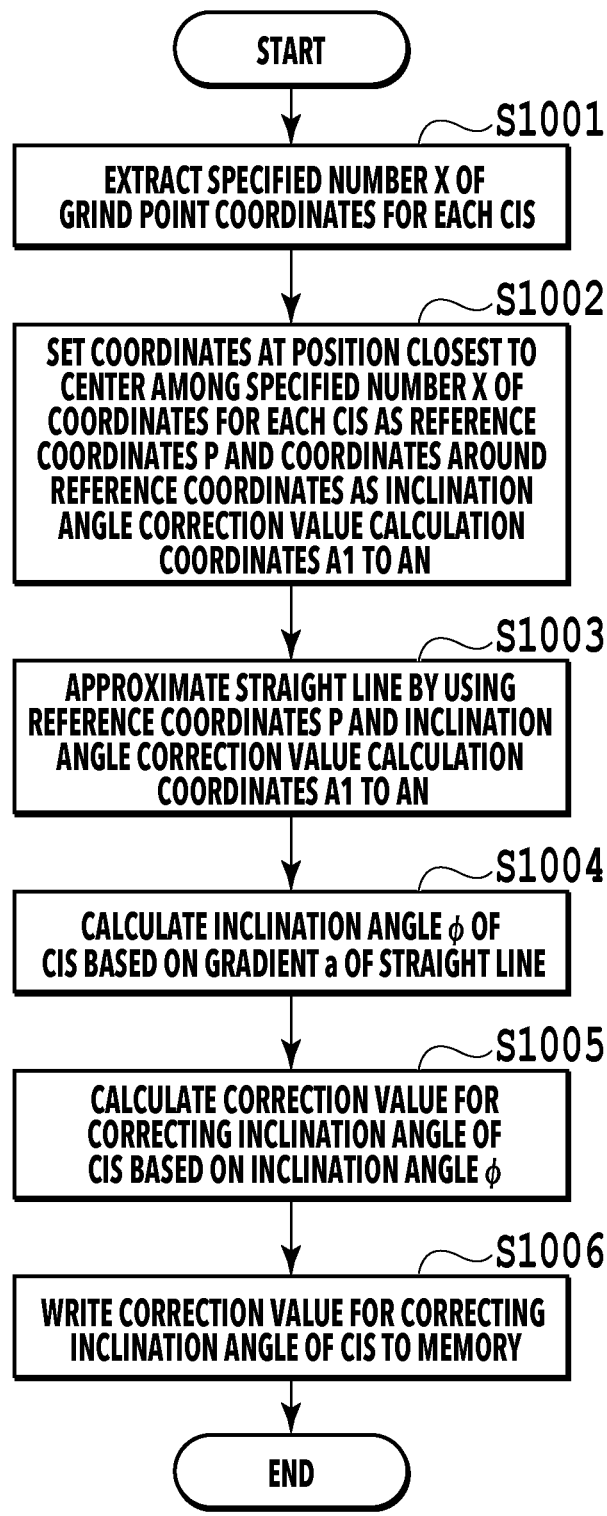
FIG. 10 is a flowchart explaining correction value calculation accompanied by the CIS inclination angle derivation in the first embodiment.

Here, by using the inclination angle derivation pattern of the CIS 106 shown in FIG. 8A, the algorithm shown in FIG. 9, and the flowchart shown in FIG. 10, a flow of deriving the inclination angle of the CIS 106 by reading the circular dot pattern 401 is shown. The circular dot pattern group shown in FIG. 8A includes a circular dot pattern (referred to as reference dot pattern) at the center and four circular dot patterns (referred to as peripheral dot patterns) around the reference dot pattern. By using the arrangement of the circular dot patterns 401 such as this, it is made possible to derive the inclination of the CIS 106 accurately not based on the inclination at the time of document setting and the diameter error of the document conveyance roller.

First, at S1001, the CPU 204 extracts a specified number (X) of center coordinates of the circular dot pattern 401 for each CIS 106.

At S1002, for each CIS 106, the CPU 204 sets the coordinates at a position the closest to the center among the specified number X of coordinates as reference coordinates P and coordinates around the reference coordinates as inclination angle correction value calculation coordinates A1 to AN. FIG. 8A shows a case where the reference coordinates P are taken as the center and four points of the inclination angle correction value calculation coordinates A1 to A4 exist around the reference coordinates P.

At S1003, the CPU 204 approximates a straight line passing the reference coordinates P as a passing point by using the reference coordinates P and the inclination angle correction value calculation coordinates A1 to AN set at S1002.

Figure 8B:
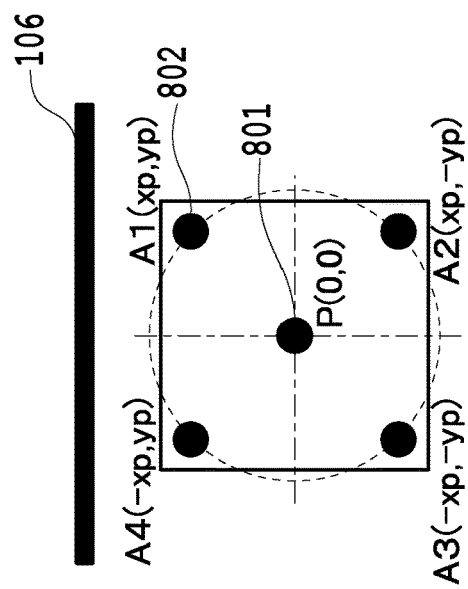
Figure 8C:
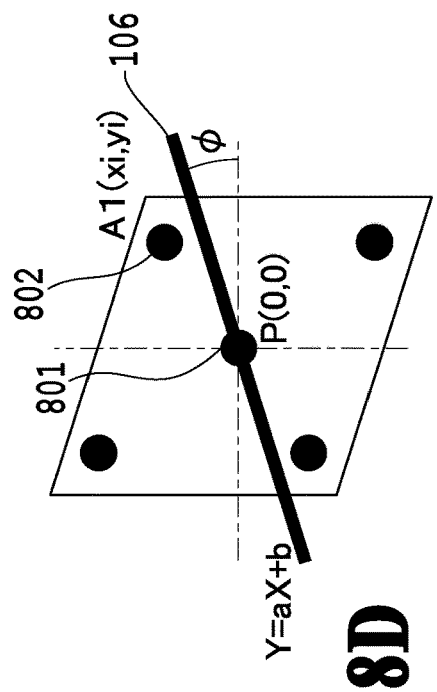

The change in coordinates at the time of approximating a straight line and the algorithm of inclination angle derivation are explained by using FIG. 8B to FIG. 8D and FIG. 9. FIG. 8B shows the coordinate changes in the inclination angle correction value calculation coordinates with the reference coordinates P being taken as a reference in a case where the document 110 is read in the inclined state and shows a case where the inclination angle θ of the document is 45 degrees. FIG. 8C shows the coordinate changes in the inclination angle correction value calculation coordinates with the reference coordinates P being taken as a reference in a case where there is a diameter error of the upstream-side document conveyance roller 107 and shows a case where the magnification in the sub scanning direction of the document conveyance roller is μ.

FIG. 9 shows formulas used in the derivation algorithm of an inclination angle φ of the CIS 106. Formula (1) indicates that the total of each inclination angle correction value calculation coordinates with the reference coordinates P being taken as a reference is 0. The calculation formula of formula (1) does not change even in a case where there are influences of the inclination angle θ of the document and the magnification μ in the sub scanning direction by the document conveyance roller, which are shown in FIG. 8B and FIG. 8C.

Figure 8D:
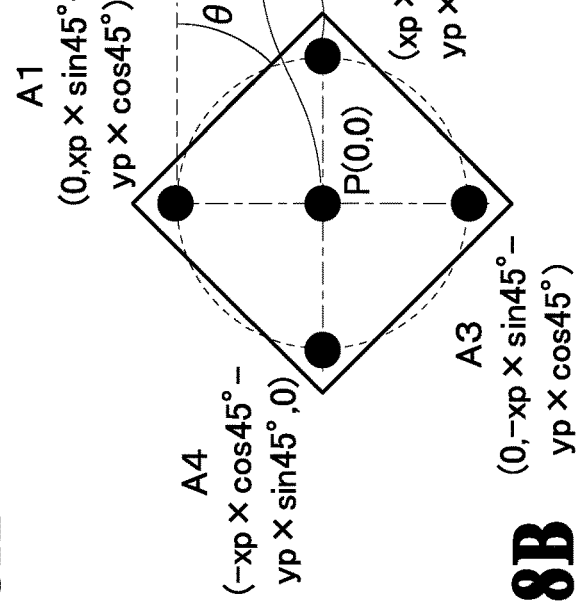

Next, FIG. 8D shows the coordinate changes in the inclination angle correction value calculation coordinates with the reference coordinates P being taken as a reference in a case where the document 110 is read in the state of the presence of the inclination angle φ of the CIS 106. Formula (2) to formula (5) in FIG. 9 express the coordinates after the change at the time of the coordinate changes in the inclination angle correction value calculation coordinates by the inclination angle φ of the CIS 106.

Formula (6) in FIG. 9 is the approximate formula that is used at the time of approximating a straight line by the inclination angle correction value calculation coordinates A1 to AN with the reference coordinates P being taken as a reference, which is performed at S1003. Formula (7) in FIG. 9 expresses the gradient and intercept in formula (6). Formula (8) to formula (10) are results of substituting formula (2) to formula (5) in each constituent formula in formula (7) in FIG. 9.

By substituting formula (8) to formula (10) in FIG. 9 in formula (7), it is possible to simplify the gradient and slope to those expressed in formula (11). The formula for deriving the inclination angle θ of the CIS 106 based on the gradient shown in formula (11) is formula (12).

At S1003, the CPU 204 calculates the gradient a of a straight line by approximating the straight line in accordance with the algorithm shown in FIG. 9.

At S1004, the CPU 204 calculates the inclination angle φ of the CIS 106 by using formula (12) base on a calculated at S1003.

At S1005, the CPU 204 calculates the correction value for correcting the inclination angle of the CIS 106 based on φ calculated at S1004.

At S1006, the CPU 204 stores the correction value calculated at S1005 by writing the correction value to the memory 208.

As the method of applying a correction value, it is possible to adopt a method of performing reading while changing the access portion of the memory at each time of reading based on the correction value written to the memory at S1006, a method of physically adjusting the inclination of the CIS 106, and so on. Alternatively, it may also be possible to directly change the access portion of the memory or physically adjust the inclination of the CIS 106 by using the gradient a of the straight line, which is calculated at S1003, without finding the inclination angle φ of the CIS 106.

<<Connecting Position Derivation Processing>>

Figure 12A:
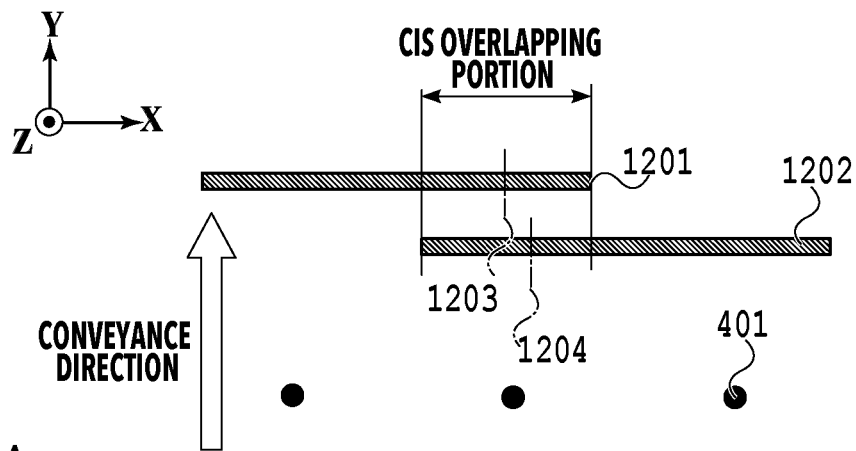
FIG. 12A to FIG. 12C are diagrams explaining derivation of the connecting position between the CIS's in the first embodiment.
Figure 12B:
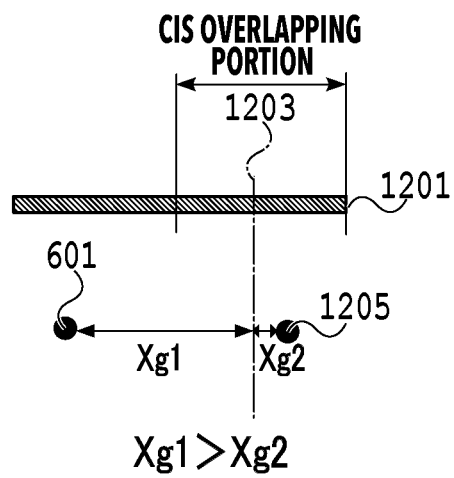
Figure 12C:
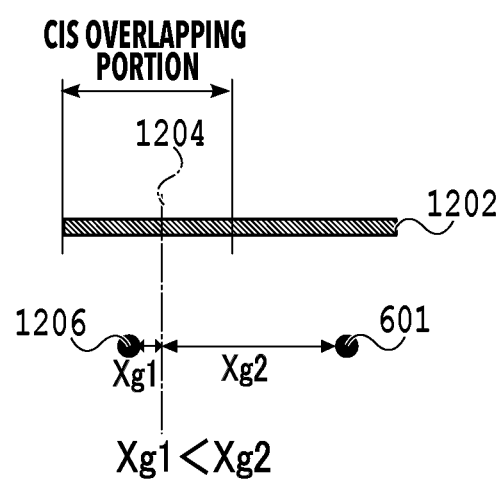
Figure 13:
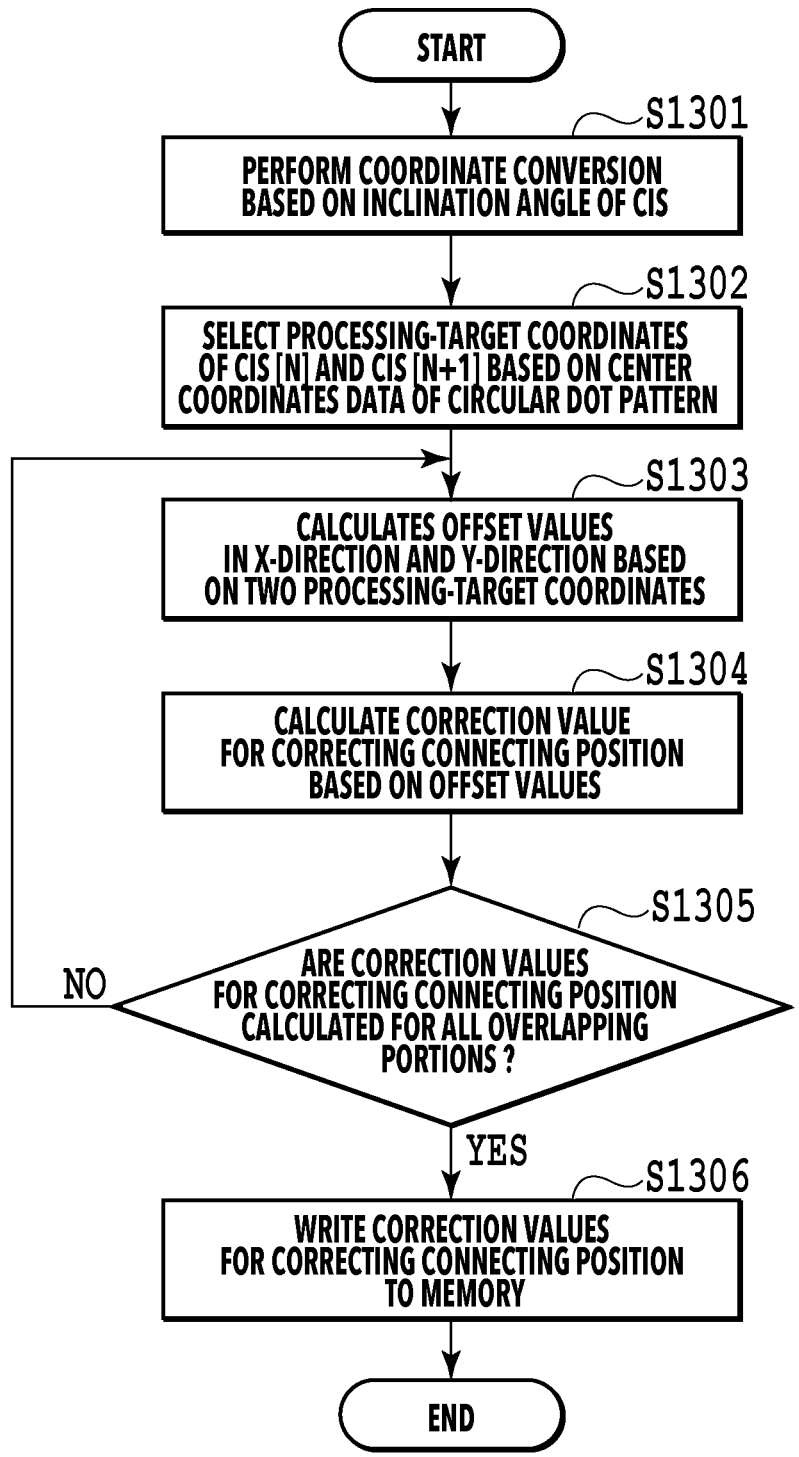
FIG. 13 is a flowchart showing a flow of derivation of a correction value for correcting the connecting position in the first embodiment.

In the following, connecting position derivation processing in the present embodiment is explained by using FIG. 11A to FIG. 16. FIG. 11A to FIG. 11C are diagrams showing coordinate conversion based on the inclination angle of the CIS 106, which is obtained by the immediately previous correction value calculation. FIG. 12A to FIG. 12C are diagrams showing an outline of derivation of the connecting position between the CIS's 106. FIG. 13 is a flowchart showing a flow of processing to derive the correcting position based on the read data.

Figure 7:
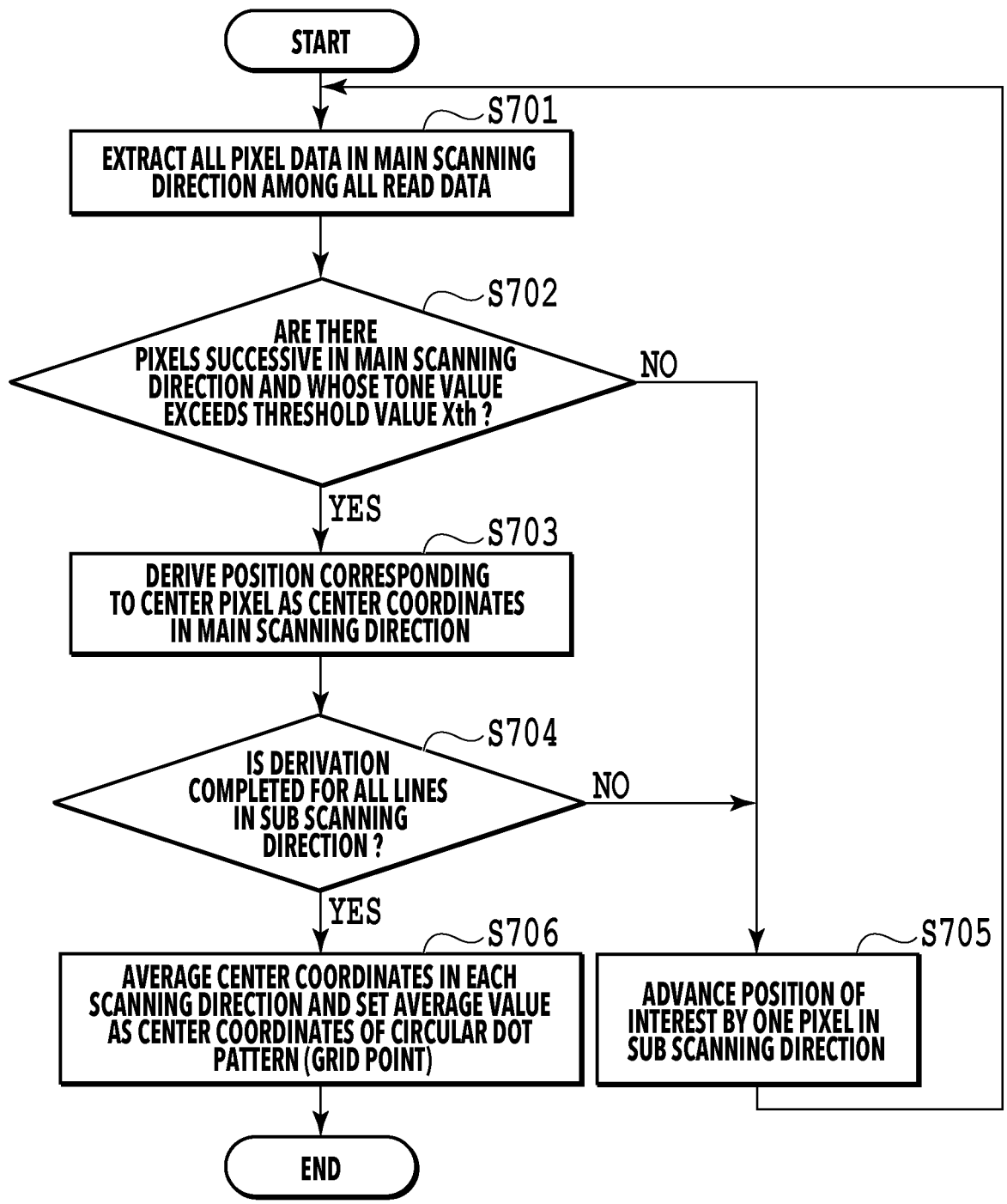
FIG. 7 is a flowchart of processing to derive center coordinates of the circular dot pattern in the first embodiment.

First, at S1301, the CPU 204 performs coordinate conversion to convert the center coordinates 601 of the circular dot pattern 401, which are explained in FIG. 6 and FIG. 7, into the state before the change by the inclination of the CIS 106 based on the inclination angle of the CIS 106, which is obtained by the immediately previous correction value calculation. FIG. 11A is a diagram showing the change in the center coordinates 601 of the circular dot pattern 401 by the inclination angle φ of the CIS 106. FIG. 11B is a diagram in a case of performing coordinate conversion to convert the center coordinates 601 of the circular dot pattern 401 into the state before the change by the inclination of the CIS 106 by using the inclination angle φ of the CIS 106, which is calculated by the immediately previous correction value calculation. The coordinate conversion based on the inclination angle φ of the CIS 106 is performed in accordance with calculation formulas shown in FIG. 11C.

Here, an aspect is explained in which the connecting position is derived by performing coordinate conversion for the center coordinates 601 of the circular dot pattern 401. However, it may also be possible to derive the connecting position by reading the document 110 again on which the circular dot patterns 401 are printed in the state where the inclination correction value of the CIS 106 is applied, which is obtained by the immediately previous correction value calculation.

At S1302, based on the center coordinates 601 of the circular dot pattern 401 for which the coordinate conversion has been performed at S1301, the CPU 204 selects processing-target coordinates of an Nth CIS (described as CIS [N]) 1201 and an (N+1)th CIS (described as CIS [N+1]). FIG. 12A is a diagram showing the arrangement of the circular dot patterns 401 for the overlapping portion of a plurality of the CIS's 106. FIG. 12B shows reading results of the CIS

[N] 1201 and FIG. 12C shows reading results of the CIS [N+1] 1202. As shown in FIG. 12B, for the data read by the CIS [N] 1201, the center coordinates 601 of the circular dot pattern 401 the closest from a connecting reference position 1203 of the CIS [N], which is determined in advance as a fixed value, are selected as processing-target coordinates 1205 of the CIS [N]. Similarly, as shown in FIG. 12C, as regards the CIS [N+1] 1202 also, the center coordinates 601 of the circular dot pattern 401 the closest from a connecting reference position 1204 of the CIS [N+1] are selected as processing-target coordinates 1206 of the CIS [N+1].

At S1303, the CPU 204 calculates offset values in the X-direction and the Y-direction based on the differences in the X-coordinate and the Y-coordinate between the processing-target coordinates 1205 of the CIS [N] and the processing-target coordinates 1206 of the CIS [N+1], which are selected at S1302.

At the S1304, the CPU 204 calculates the correction value for correcting the connecting position based on the offset values in the X-direction and the Y-direction, which are calculated at S1303.

At S1305, the CPU 204 determines whether the correction values for correcting the connecting position are calculated for all the overlapping portions of the plurality of the CIS's 106. In a case where the determination results at this step are affirmative, the processing advances to S1306. On the other hand, in a case where the determination results at this step are negative (that is, in a case where the calculation of the correction values for correcting the connecting position is not completed for all the overlapping portions of the plurality of the CIS's 106), the processing returns to S1302 and the calculation of the correction value for correcting the connecting position is calculated for the next overlapping portion.

At S1306, the CPU 204 stores the correction values for correcting the connecting position derived for all the overlapping portions of the plurality of the CIS's 106 by writing them to the memory 208.

As the method of applying the found correction value, it is possible to adopt a method of performing reading while changing the access portion of the memory at the time of reading based on the correction value written to the memory at S1306, a method of physically adjusting the position of the CIS 106, and so on.

Further, in order to suppress the influence of the quantization error in deriving the center coordinates 601 of the circular dot pattern 401 at the time of connecting position derivation, it is recommended to arrange a plurality of the circular dot patterns 401 for the overlapping portion. Then, in the arrangement configuration described previously, at S1302, by using the connecting reference positions of the CIS [N] and the CIS [N+1], the processing-target coordinates 1205 and 1206 of the CIS [N] and the CIS [N+1] are selected respectively, which correspond to the number of grid points read at the overlapping portion. At the time of calculating the correction value for correcting the connecting position at S1304, the results of averaging the offset values in the X-direction and the Y-direction respectively are used, which are calculated at S1303.

Figure 14A:
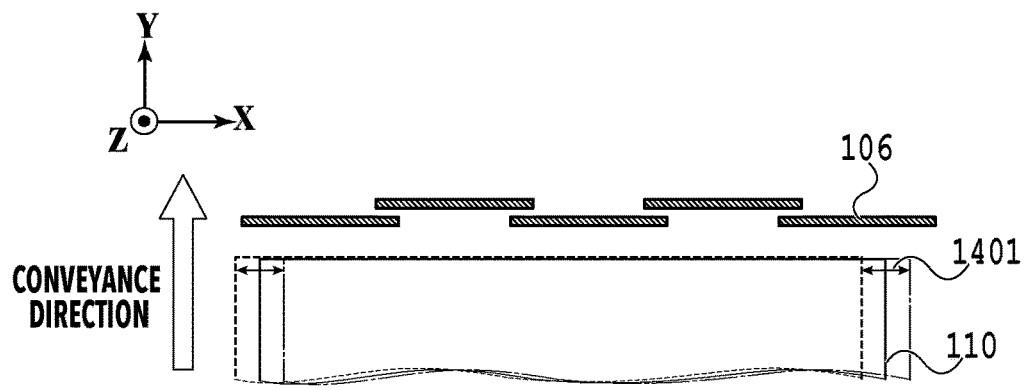
FIG. 14A to FIG. 14C are diagrams showing arrangement of circular dot patterns in a case where there is a deviation at the time of document setting.
Figure 14B:
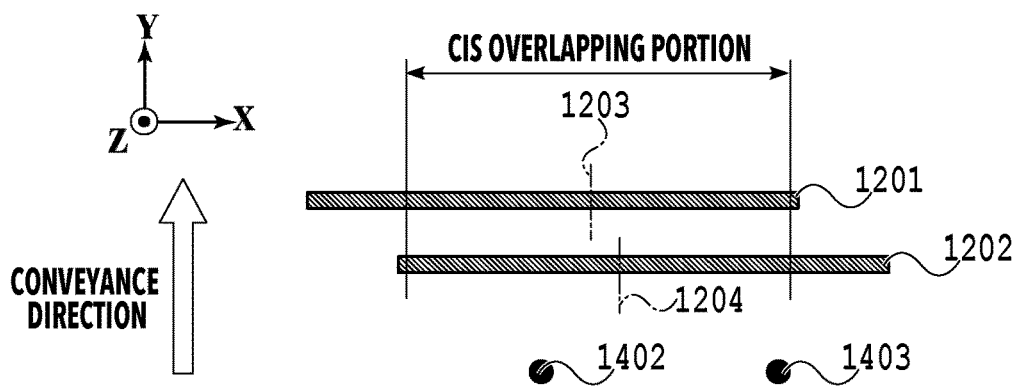
Figure 14C:
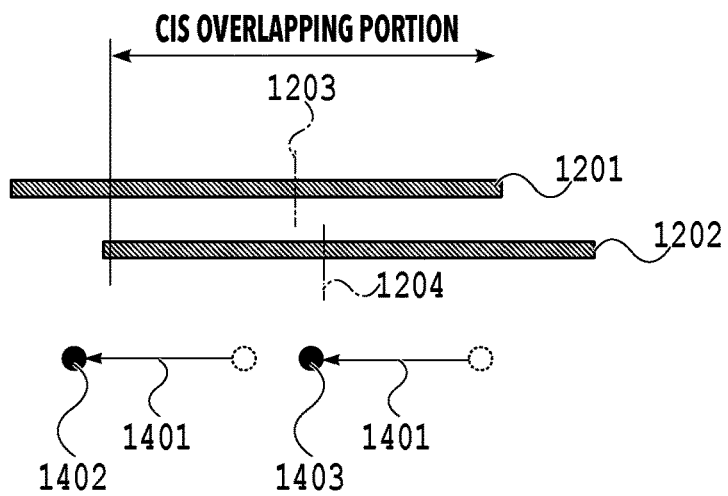

FIG. 14A to FIG. 14C show arrangement of circular dot patterns in the state where there is a deviation 1401 at the time of document setting. Here, as shown in FIG. 14A, a case is discussed where the deviation 1401 occurs in document setting at the time of a user setting the document 110. In such a case, with the configuration in which only the one circular dot pattern 401 is arranged for the overlapping portion of the CIS's 106 as shown in FIG. 12A, there is a possibility that even one pattern is not included for the overlapping portion. As the measures against this, as shown in FIG. 14B, arrangement is performed so that two patterns, that is, a first connecting position correction value calculation processing pattern 1402 and a second connecting position correction value calculation processing pattern 1403 are included for the overlapping portion of the CIS's 106. Due to the measures shown in FIG. 14B, even in a case where the deviation 1401 at the time of document setting occurs as shown in FIG. 14C, it is made possible to derive the connecting position between the CIS's 106.

Figure 15A:
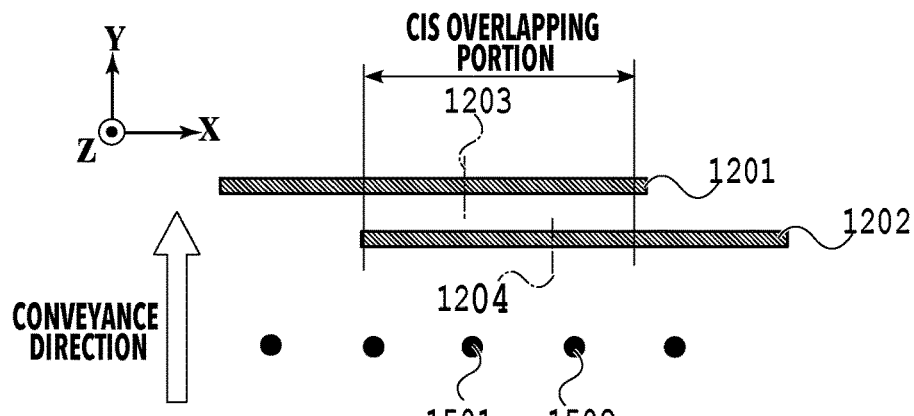
FIG. 15A to FIG. 15C are diagrams explaining measures against erroneous derivation of the connecting position in the first embodiment.
Figure 15B:
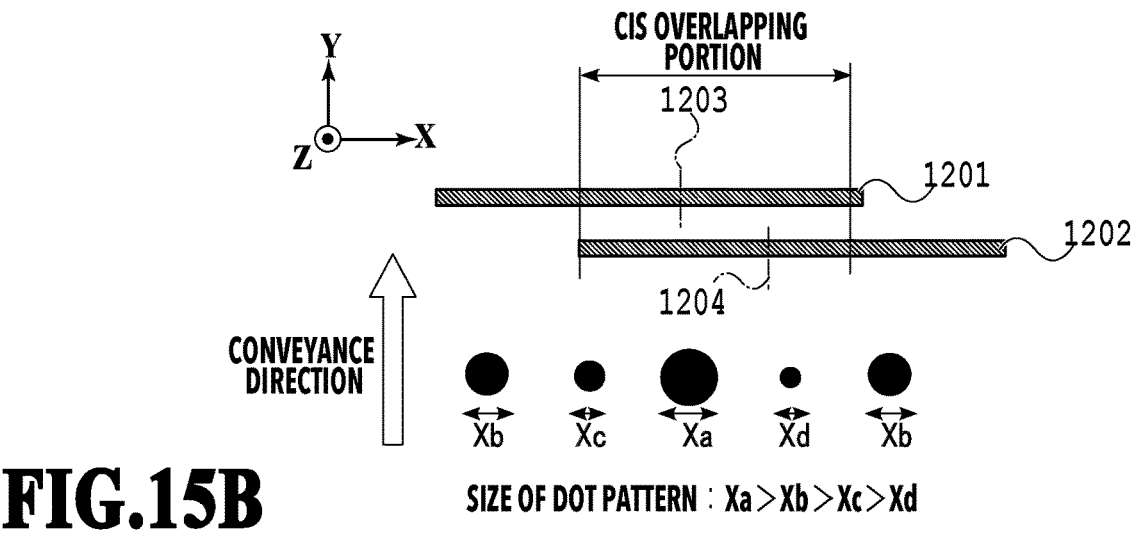
Figure 15C:
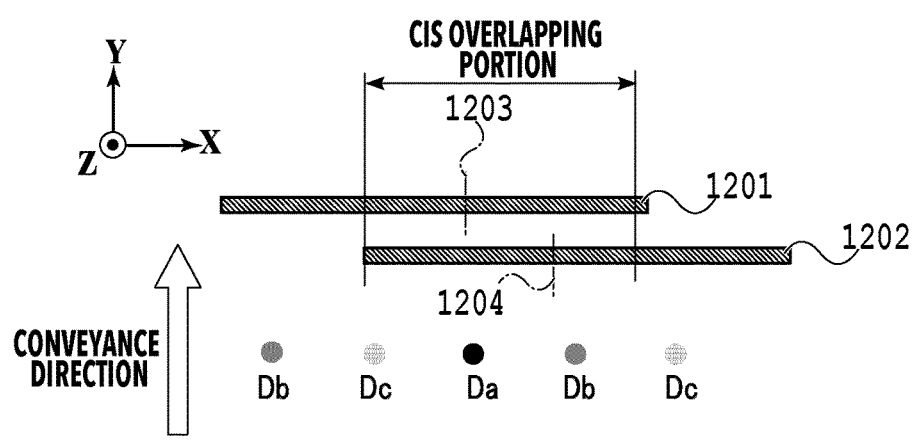

FIG. 15A to FIG. 15C show pattern arrangement that prevents erroneous derivation of the connecting position in the configuration in which a plurality of dot patterns is arranged for the overlapping portion of the CIS's 106. As shown in FIG. 15A, in order to suppress the influence of the quantization error described previously, or in order to suppress the influence of the deviation at the time of document setting, there is a case where a plurality of dot patterns is arranged for the overlapping portion of the CIS's 106. Ideally, it is desirable for the connecting reference position 1203 of the CIS [N] and the connecting reference position 1204 of the CIS [N+1] to be located on the same straight line in the document conveyance direction (to be the same in the main scanning direction). However, in reality, the positions of the plurality of the CIS's 106 deviate due to the mechanical attachment tolerance, and therefore, these reference positions deviate from the straight line. Because of this, depending on the amount of deviation in the CIS position, there is a possibility that it is no longer possible to select the same dot pattern at S1302, such as a dot pattern 1501 the closest from the reference coordinates of the CIS [N] and a dot pattern 1502 the closest from the reference coordinates of the CIS [N+1].

FIG. 15B shows a configuration including a plurality of dot patterns whose sizes are different. FIG. 15C shows a configuration including a plurality of dot patterns whose optical densities are different. By adopting the configuration in FIG. 15B, for example, in a case where a dot pattern the closest to the connecting reference position 1203 of the CIS [N] and the connecting reference position 1204 of the CIS [N+1] and whose diameter is larger than that of Xd is selected, it is made possible to select the same pattern at S1302. Further, by adopting the configuration in FIG. 14C, in a case where a dot pattern the closest to the connecting reference position 1203 of the CIS [N] and the connecting reference position 1204 of the CIS [N+1] and whose optical density is higher than that of Db is selected, it is also made possible to select the same pattern at S1302.

By using the configuration in which a plurality of dot patterns is arranged for the overlapping portion of the CIS's 106 as explained above, it is made possible to suppress the erroneous derivation of the connecting position. In addition to the dot patterns whose size or optical density is changed, dot patterns whose color is changed are also effective for suppressing the erroneous derivation.

Figure 16:
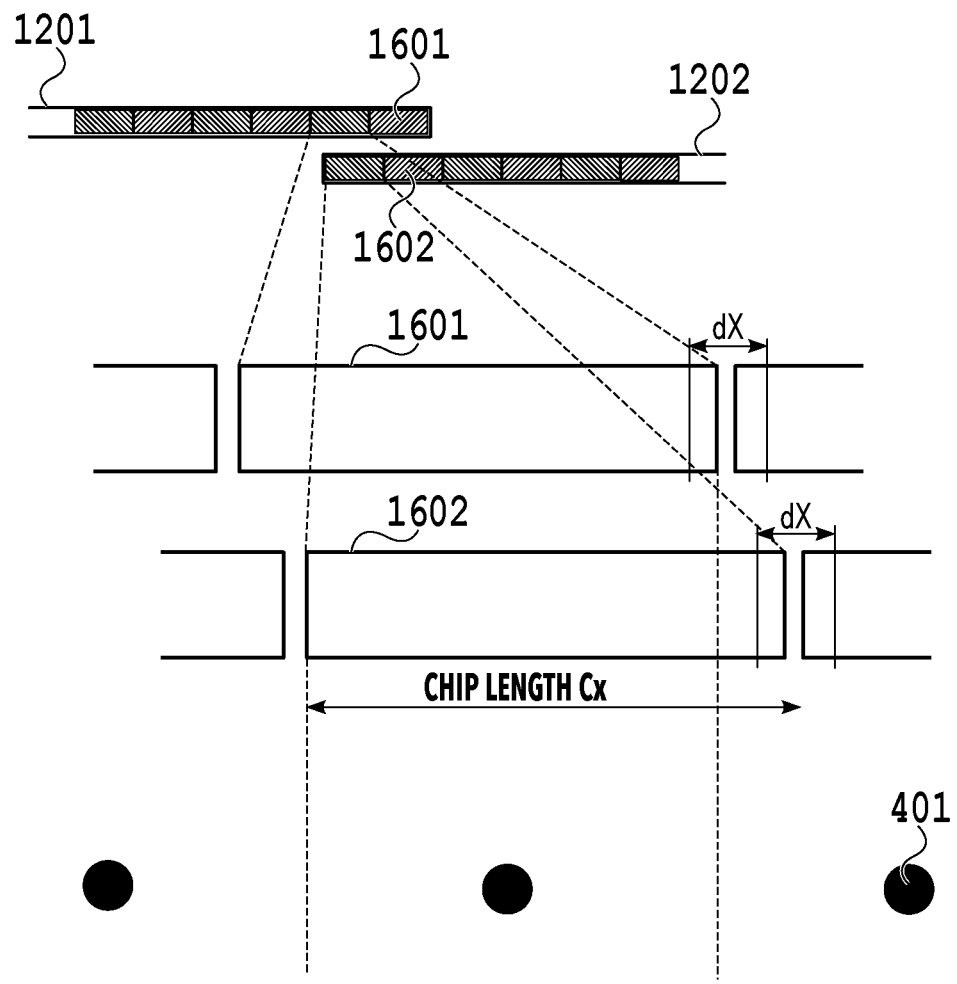
FIG. 16 is a diagram showing an internal structure of the CIS and arrangement of the circular dot patterns in the first embodiment.

FIG. 16 shows the internal structure of the CIS [N] 1201 and the CIS [N+1] 1202 and arrangement of the circular dot patterns 401. The CIS 106 generally includes a plurality of chips and in the CIS [N] 1201, a misalignment dx between chips exists for each internal chip 1601 and in the CIS [N+1] 1202, the misalignment dx exists for each internal chip 1602. As shown in FIG. 16, for the overlapping portion (referred to as chip overlapping portion) of the chip 1601 within the CIS [N] and the chip 1602 within the CIS [N+1], the circular dot pattern 401 is arranged. Due to this, it is possible to derive the connecting position between the CIS's 106 by ignoring the influence of the gap dx between the chips. In a case where the influence of the deviation 1401 in document setting shown in FIG. 14A to FIG. 14C is suppressed, it is sufficient to arrange the two circular dot patterns 401 for the overlapping portion of the chip 1601 within the CIS [N] and the chip 1602 within the CIS [N+1].

By the above, it is possible to implement highly accurate connecting processing between line image sensors, by deriving the connecting position between the CIS's 106 in the state where the inclination of the CIS 106 is derived accurately, not based on the inclination at the time of document setting and the diameter error of the document conveyance roller.

Further, it is possible to use the same pattern at the time of derivation of the connecting position between the CIS's 106 and at the time of derivation of the inclination of the CIS 106, and therefore, it is possible to reduce the creation cost of the calibration chart.

Next, a method is explained that adjusts the connecting position based on the difference in the amount of conveyance in the direction in which the line image sensors are arranged (X-direction) between the point in time of the connecting position derivation and the point in time of the derived connecting position application.

Figure 17A:
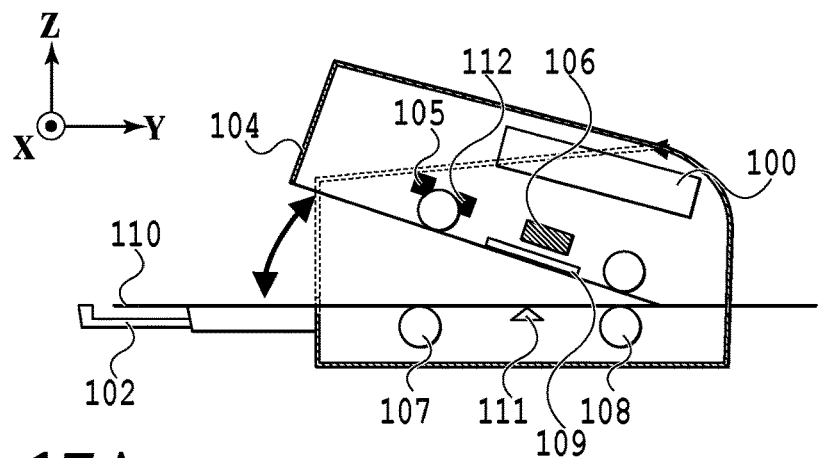
FIG. 17A to FIG. 17C are schematic diagrams showing the influence of skew.
Figure 17B:
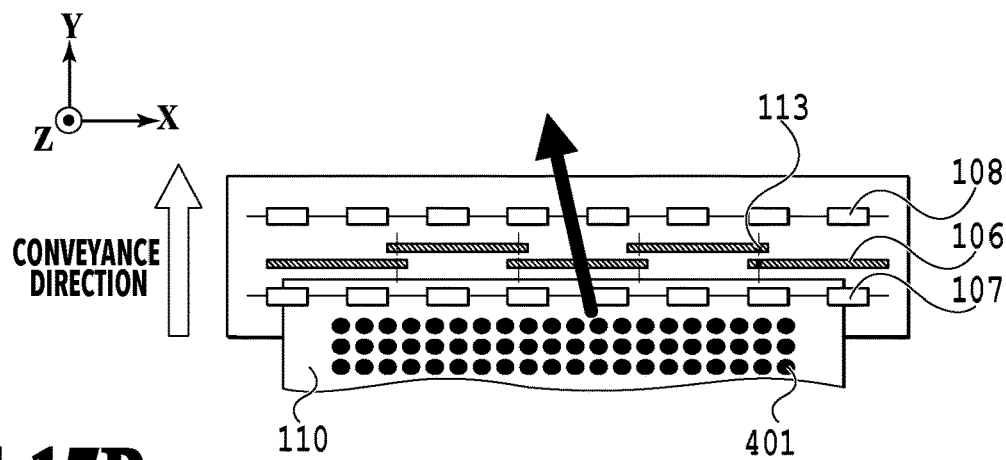
Figure 17C:
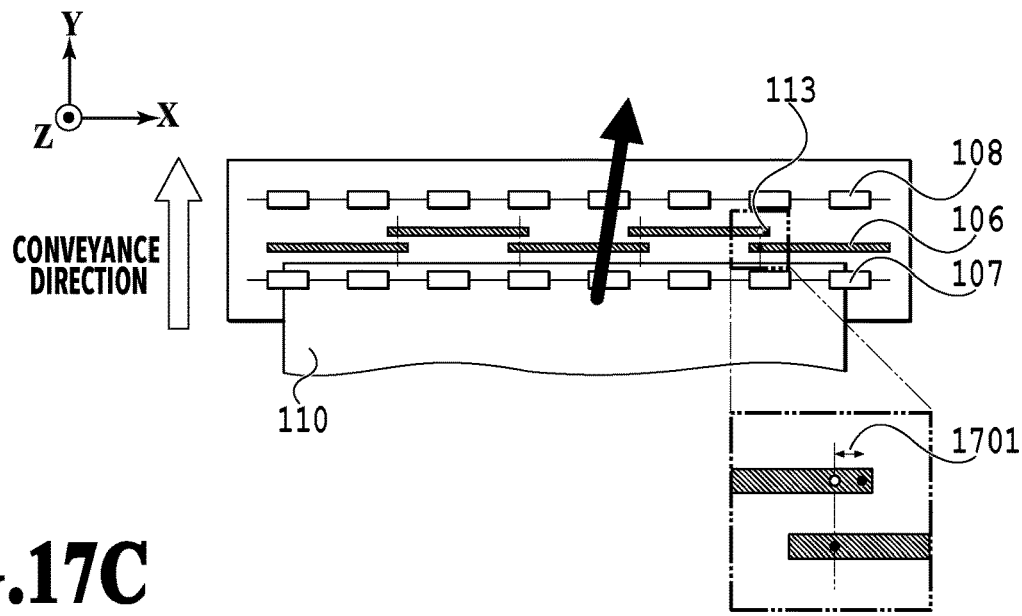

FIG. 17A to FIG. 17C are schematic diagrams for explaining the influence of skew of the image reading apparatus. FIG. 17A is a cross-sectional diagram of the image reading apparatus in a case where the upper cover is opened and closed. A general image reading apparatus is designed so that the upper cover 104 can be opened and closed in order to remove a document from the inside at the time of jam processing, to wipe off internal stain, and so on. Further, the upstream-side document conveyance roller 107 and the downstream-side document conveyance roller 108 respectively include two upper and lower rollers. Each of the upstream-side document conveyance roller 107 and the downstream-side document conveyance roller 108 has somewhat backlash due to the mechanical attachment tolerance. Consequently, in a case where the upper cover 104 is opened and closed, the engagement position of the two upper and lower rollers changes. In a case where a document is conveyed in the state where the engagement position of the rollers is different, the load of each document conveyance roller is imposed on one side, that is, on the right side or the left side, during conveyance, and therefore, the document is conveyed in a skewed state.

FIG. 17B shows the calibration processing in a case where a document is skewed. In a case where the skew component explained in FIG. 17A exists in the connecting position derivation processing, which is one of the calibration processing shown in FIG. 12A to FIG. 12C and FIG. 13, the correction value for correcting the connecting position is derived as the correction value deviated by the amount corresponding to this skew component.

In contrast to this, FIG. 17C shows the normal reading processing in a case where a document is skewed. In the normal reading processing, reading of a document is performed while applying the correction value for correcting the connecting position derived by reading the calibration chart as shown in FIG. 17B. In a case where the skew component in the normal reading processing and the skew component in the calibration processing are equal, the amount of deviation due to the skew component at the time of the normal reading processing and the amount of deviation due to the skew component at the time of the calibration processing are equal, and therefore, it is possible to perform the connecting processing without being affected by the skew. However, as shown in FIG. 17A, in a case where the opening and closing of the upper cover 104 occur, the skew component at the time of document conveyance changes, and therefore, in a case where the upper cover 104 is opened and closed after the calibration processing and the like, there is a possibility that the skew component is different between the point in time of the calibration processing and the point in time of the normal reading processing. In a case where the normal reading processing is performed in the state where the skew components are different, a connecting deviation 1701 due to the difference in the skew component occurs.

Figure 19:
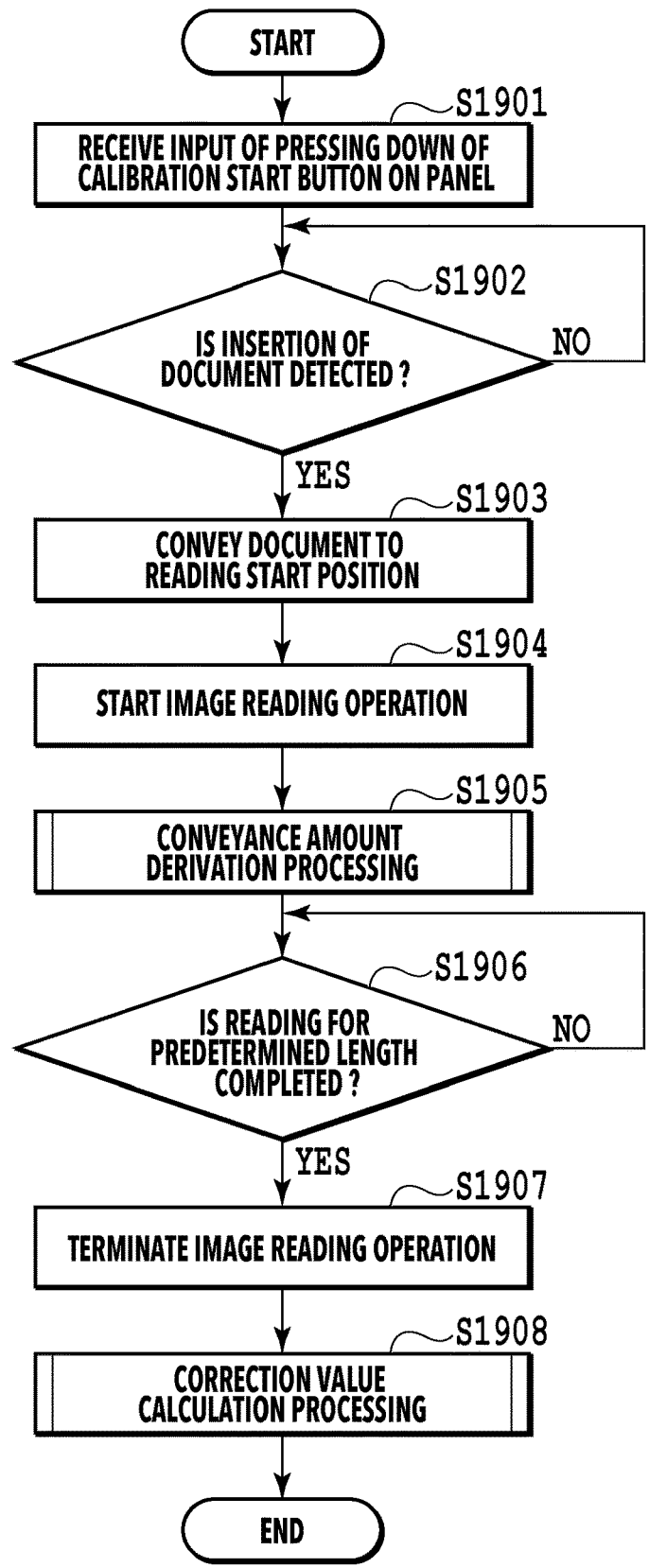
FIG. 19 is a flowchart of calibration processing for suppressing the influence of skew in the first embodiment.

FIG. 18A to FIG. 18C are schematic diagrams showing a unit configured to derive the amount of conveyance necessary for suppressing the influence of skew of the image reading apparatus. FIG. 18A is a diagram explaining calibration processing for suppressing the influence of skew and FIG. 19 shows a flowchart of the calibration processing. Further, FIG. 21 shows a flowchart of conveyance amount derivation processing that is performed by the image reading apparatus.

As shown in FIG. 18A, the image reading apparatus has a conveyance amount measurement unit 1801 configured to directly measure an actual X-direction conveyance amount of a document for suppressing the influence of skew at the time of calibration processing. The conveyance amount measurement unit 1801 has a structure that has an image capturing element and a lens and which obtains an image printed on paper at predetermined time intervals $\Delta t$ and finds an amount of movement $\Delta X$ based on the correlation of the obtained images. By using the conveyance amount measurement unit 1801 having the structure such as this, it is possible to derive the X-direction conveyance amount of the document based on the amount of movement by finding the amount of movement of the document per unit time. The conveyance amount measurement unit 1801 is arranged on the upstream side in the document conveyance direction relative to the CIS 106 and may have a configuration in which one of the front surface and the back surface of a document is read.

Figure 21:
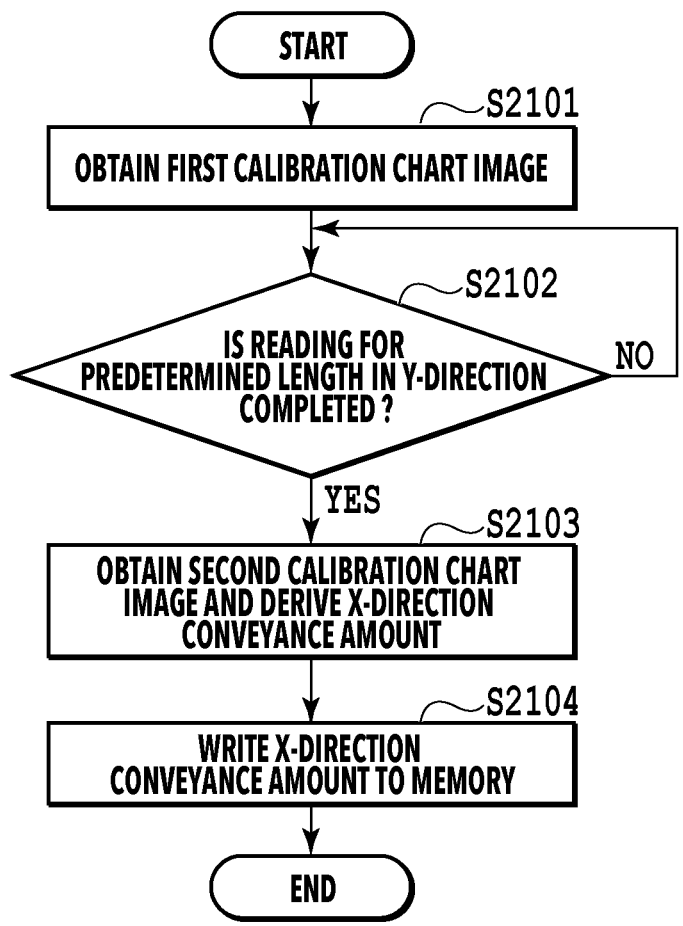
FIG. 21 is a flowchart of X-direction conveyance amount derivation processing in the first embodiment.

Next, the calibration processing for suppressing the influence of skew is explained by using FIG. 19 and FIG. 21. S1901 to S1904 and S1906 to S1608 in FIG. 19 are the same as S301 to S304 and S305 to S307 in FIG. 3, and therefore, explanation is omitted.

At S1905 next to S1904, the CPU 204 performs the X-direction conveyance amount derivation processing of a document. FIG. 21 is a detailed flowchart of the X-direction conveyance amount derivation processing of a document (S1905).

In the X-direction conveyance amount derivation processing of a document, at S2101, the CPU 204 obtains a calibration chart image (referred to as a first calibration chart image) at the time of start of the X-direction conveyance amount derivation processing of a document by performing image capturing by using the image capturing element of the conveyance amount measurement unit 1801.

At S2102, the CPU 204 determines whether the reading of the calibration chart by the CIS 106 for a predetermined length in the Y-direction is completed. In a case where the determination results at this step are affirmative, the processing advances to S2103. On the other hand, in a case where the determination results at this step are negative, the reading of the calibration chart is continued.

At S2103, the CPU 204 obtains a calibration chart image (referred to as a second calibration chart image) by performing image capturing by using the image capturing element of the conveyance amount measurement unit 1801. Then, the CPU 204 derives the X-direction conveyance amount of a document by using the first calibration chart image obtained at S2101 and the second calibration chart image obtained at this step.

At S2104, the CPU 204 writes the amount of conveyance derived at S2103 to the memory 208. By the series of processing explained above, the X-direction conveyance amount (described as Xc) of a document at the time of calibration processing is derived.

Figure 20:
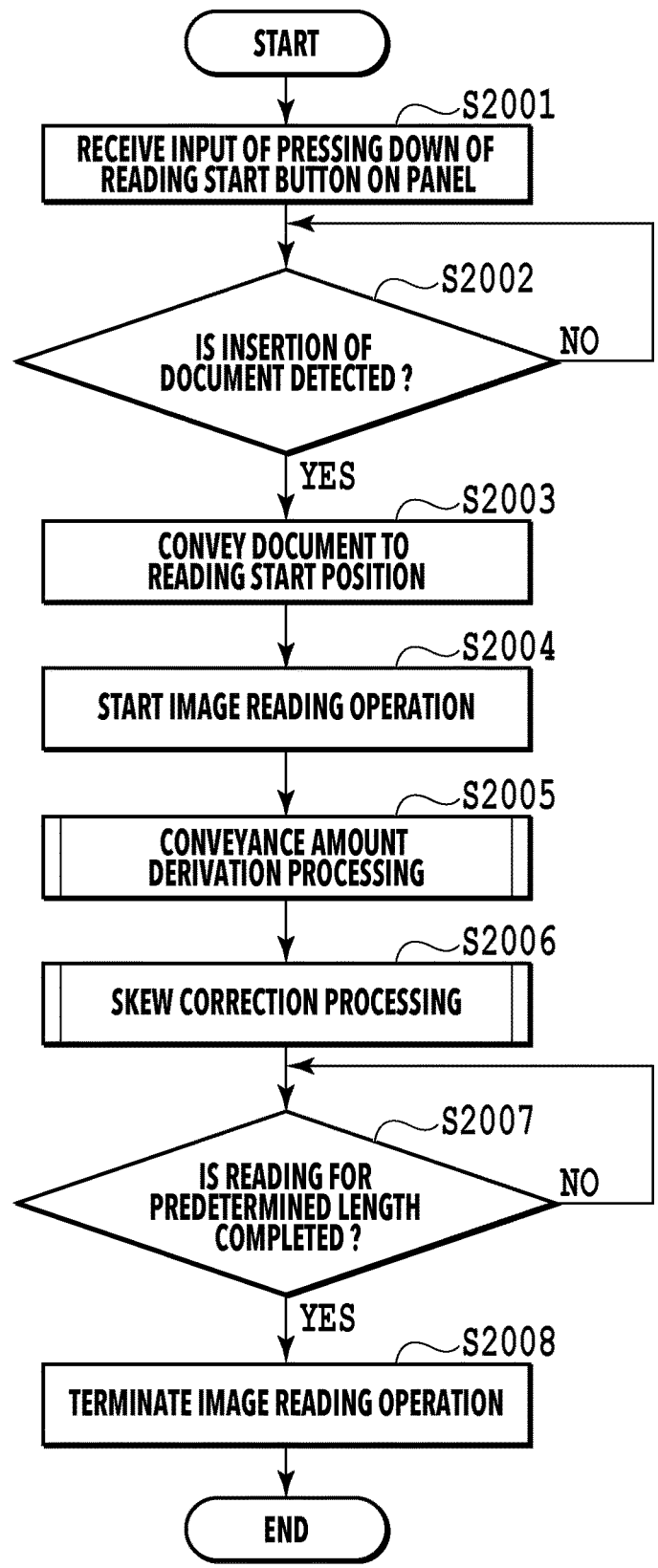
FIG. 20 is a flowchart of normal reading processing for suppressing the influence of skew in the first embodiment.
Figure 22:
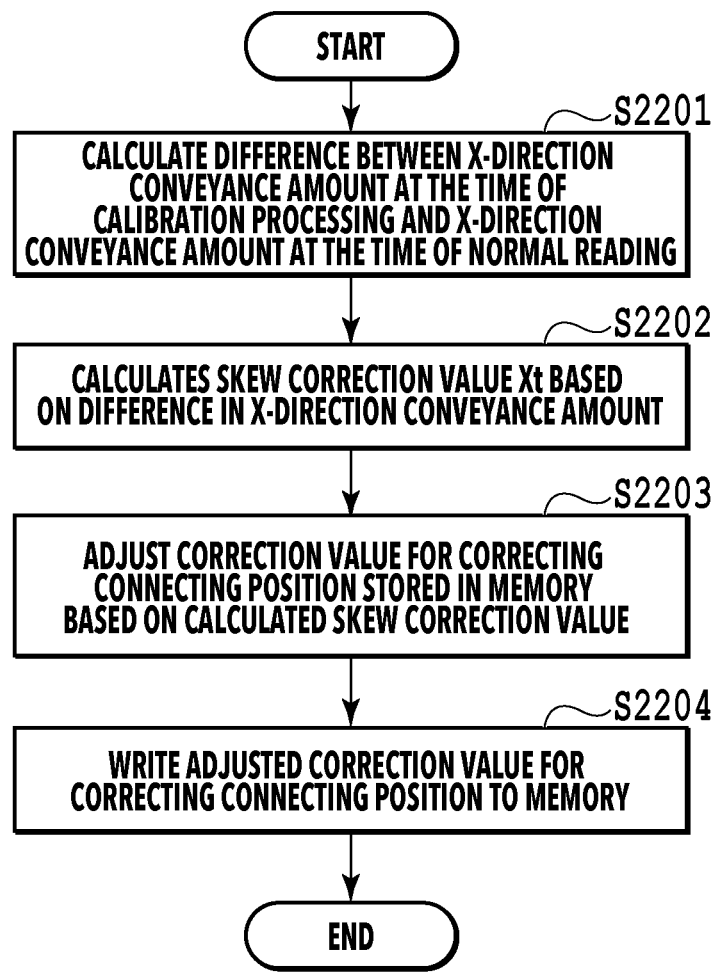
FIG. 22 is a flowchart of skew correction processing in the first embodiment.
Figure 23A:
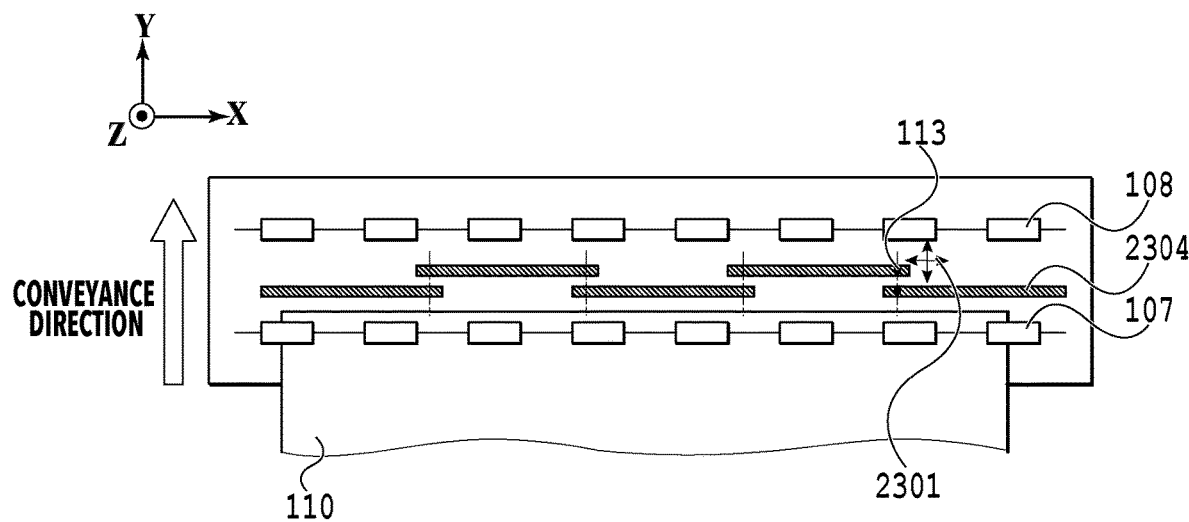
FIG. 23A shows a general configuration of an image reading apparatus having a plurality of line image sensors and FIG. 23B shows an example of reading results.
Figure 23B:
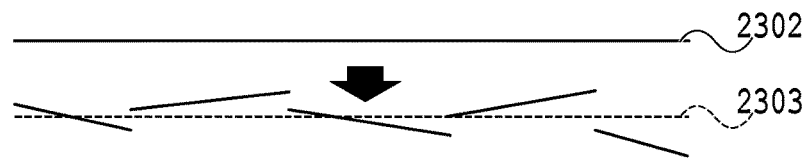

FIG. 18B is a diagram explaining normal reading processing for suppressing the influence of skew and FIG. 20 shows a flowchart of the normal reading processing. Further, FIG. 22 shows a flowchart of skew correction processing that is performed by the image reading apparatus.

As shown in FIG. 18B, the image reading apparatus has the conveyance amount measurement unit 1801. At the time of the normal reading processing also, in order to suppress the influence of skew, the X-direction conveyance amount is derived as in the case of FIG. 18A by using the conveyance amount measurement unit 1801.

In the following, the normal reading processing for suppressing the influence of skew is explained by using FIG. 20 to FIG. 22.

At S2001, the CPU 204 receives instructions to press down the start read button on the operation unit 103 by a user. S2002 to S2004 and S2007 to S2008 in FIG. 20 are the same as S302 to S304 and S305 to S306 in FIG. 3, and therefore, explanation is omitted.

At S2005 after S2004, the CPU 204 performs the conveyance amount derivation processing explained in FIG. 12. By the processing at this step, the X-direction conveyance amount (described as Xs) of a document at the time of the normal reading is derived.

After deriving Xs at S2005, the CPU 204 performs skew correction processing at S2006.

Here, the skew correction processing at S2006 is explained by using FIG. 22. FIG. 22 is a detailed flowchart of the skew correction processing.

In the skew correction processing, first, at S2201, the CPU 204 compares the X-direction conveyance amount Xc derived at S1905 and the X-direction conveyance amount Xs derived at S2005 and derives a difference between Xc and Xs ($=Xc-Xs$).

At S2202, the CPU 204 calculates a skew correction value (described as Xt) based on the difference between Xc and Xs, which is derived at S2201. Specifically, as shown in FIG. 18C, the skew correction value Xt is calculated based on a Y-direction gap (described as Yg) of each CIS 106 and the document conveyance speed.

At S2203, the CPU 204 adjusts the correction value for deriving the connecting position stored at S1306 based on the skew correction value Xt calculated at S2202. Specifically, the CPU 204 adds the skew correction value Xt to the correction value for deriving the connecting position stored at S1306.

At S2204, the CPU 204 updates the correction value for deriving the connecting position, that is, overwrites the correction value for deriving the connecting position adjusted at S2203 to the memory 208.

<Effects of the Present Embodiment>

As explained above, according to the present embodiment, based on the difference between the X-direction conveyance amount at the time of calibration processing and the X-direction conveyance amount at the time of normal reading, it is possible to suppress the influence of skew during document conveyance at the time of correction of the connecting position between the CIS's 106. The correction method of the connecting position between the CIS's 106 is implemented by changing the portion from which reading is performed within the image data storage unit in which the image data obtained by each line image sensor is stored.

In the present embodiment, as the pattern for calibration processing, the calibration chart including the dot patterns 401 is used, but for the purpose of suppressing the influence of skew, it may also be possible to use another pattern, such as a straight line pattern, not limited to the dot pattern.

As regards the error component in the Y-direction by the skew, which is not described in the present embodiment, it is sufficient to directly derive the Y-direction conveyance amount as in the case of the X-direction conveyance amount that is derived directly by the conveyance amount measurement unit 1801, by using the conveyance amount measurement unit 1801 as well, or by separately providing a conveyance amount measurement unit. Due to this, as described previously, it is made possible to suppress the influence of skew based on the difference in the Y-direction conveyance amount. Alternatively, it may also be possible to suppress the error component in the Y-direction by the skew by estimating the Y-direction conveyance amount from the X-direction conveyance amount derived by the conveyance amount measurement unit 1801 and based on the estimated Y-direction conveyance amount.

It may also be possible to appropriately combine the contents of the embodiment described previously.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, it is possible to implement highly accurate image connecting processing between line image sensors without being affected by the skew of a document during conveyance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-073186, filed Apr. 23, 2021, which is hereby incorporated by reference wherein in its entirety.

What is claimed is:

1. An image reading apparatus comprising:
    a plurality of line image sensors arrayed in a first direction;
    a conveyance unit configured to convey a document in a second direction intersecting with the first direction;
    a calculation unit configured to calculate a correction value for correcting a deviation at the time of connecting image data obtained by each of the plurality of line image sensors based on read data obtained by reading a chart with the plurality of line image sensors, on which a plurality of dot patterns is printed and which is conveyed by the conveyance unit;
    a measurement unit configured to measure an amount of conveyance in the first direction in a case where the document is conveyed in the second direction by the conveyance unit; and
    an adjusting unit configured to adjust the correction value based on the amount of conveyance in the first direction in a case where the read data is obtained and the amount of conveyance in the first direction in a case where the image data is obtained.

2. The image reading apparatus according to claim 1, wherein
    the measurement unit has an image capturing element and a lens.

3. The image reading apparatus according to claim 2, wherein
    by image capturing of the document by the image capturing element, a first image and a second image different from the first image are obtained and
    the second image is captured after the first image is captured and in a case where the document is conveyed a predetermined length in the second direction.

4. The image reading apparatus according to claim 3, wherein
    the first direction conveyance amount is derived based on the first image and the second image.

5. The image reading apparatus according to claim 4, wherein
    the adjusting unit adds a value based on a difference between the first direction conveyance amount at the time of obtaining the read data and the first direction conveyance amount at the time of obtaining the image data to the correction value.

6. The image reading apparatus according to claim 1, wherein
    the conveyance unit includes a first document conveyance roller and a second document conveyance roller that is arranged on the downstream side of the first document conveyance roller in the second direction.

7. The image reading apparatus according to claim 6, wherein
    the plurality of line image sensors is arranged between the first document conveyance roller and the second document conveyance roller in the second direction.

8. The image reading apparatus according to claim 7, wherein
    the measurement unit is arranged on the upstream side of the plurality of line image sensors in the second direction.

9. The image reading apparatus according to claim 8, wherein
    the measurement unit is arranged on the downstream side of the first document conveyance roller in the second direction.

10. The image reading apparatus according to claim 1, wherein
    based on the correction value adjusted by the adjusting unit, a portion from which reading is performed is changed within an image data storage unit in which image data obtained by each of the plurality of line image sensors is stored.

11. The image reading apparatus according to claim 1, wherein
    the plurality of dot patterns is arranged in isolation from one another on the chart and
    each of the plurality of dot patterns is substantially circular.

12. A control method of an image reading apparatus comprising:
    a plurality of line image sensors arrayed in a first direction; and
    a conveyance unit configured to convey a document in a second direction intersecting with the first direction, the control method comprising:
    a calculation step of calculating a correction value for correcting a deviation at the time of connecting image data obtained by each of the plurality of line image sensors based on read data obtained by reading a chart with the plurality of line image sensors, on which a plurality of dot patterns is printed and which is conveyed by the conveyance unit;
    a measurement step of measuring an amount of conveyance in the first direction in a case where the document is conveyed in the second direction by the conveyance unit; and
    an adjusting step of adjusting the correction value based on the amount of conveyance in the first direction in a case where the read data is obtained and the amount of conveyance in the first direction in a case where the image data is obtained.

13. A non-transitory computer readable storage medium storing a program for causing a computer to perform a control method of an image reading apparatus comprising:
    a plurality of line image sensors arrayed in a first direction; and
    a conveyance unit configured to convey a document in a second direction intersecting with the first direction, the control method comprising:
    a calculation step of calculating a correction value for correcting a deviation at the time of connecting image data obtained by each of the plurality of line image sensors based on read data obtained by reading a chart with the plurality of line image sensors, on which a plurality of dot patterns is printed and which is conveyed by the conveyance unit;
    a measurement step of measuring an amount of conveyance in the first direction in a case where the document is conveyed in the second direction by the conveyance unit; and
    an adjusting step of adjusting the correction value based on the amount of conveyance in the first direction in a case where the read data is obtained and the amount of conveyance in the first direction in a case where the image data is obtained.

* * * * *